(12) United States Patent
Hirakata et al.

(10) Patent No.: US 7,760,316 B2
(45) Date of Patent: *Jul. 20, 2010

(54) CONTACT STRUCTURE

(75) Inventors: Yoshiharu Hirakata, Atsugi (JP);
Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/480,716

(22) Filed: Jun. 9, 2009

(65) Prior Publication Data

US 2009/0244423 A1 Oct. 1, 2009

Related U.S. Application Data

(60) Continuation of application No. 10/453,684, filed on Jun. 4, 2003, now Pat. No. 7,561,242, and a division of application No. 10/125,394, filed on Apr. 19, 2002, now Pat. No. 7,443,478, and a division of application No. 09/734,177, filed on Dec. 12, 2000, now Pat. No. 6,404,480, and a division of application No. 09/361, 218, filed on Jul. 27, 1999, now Pat. No. 6,177,974, and a division of application No. 09/046,685, filed on Mar. 24, 1998, now Pat. No. 5,982,471.

(30) Foreign Application Priority Data

Mar. 27, 1997 (JP) .................................. 9-094606

(51) Int. Cl.
*G02F 1/1345* (2006.01)
*G02F 1/1339* (2006.01)

(52) U.S. Cl. ...................................... 349/149; 349/155

(58) Field of Classification Search ................. 349/138, 349/149–152, 155–156
See application file for complete search history.

(56) References Cited

U.S. PATENT DOCUMENTS 3,954,325 A 5/1976 Borden (Continued)

FOREIGN PATENT DOCUMENTS

JP 50-109696 8/1975

(Continued)

OTHER PUBLICATIONS

Acer Incorporated's Answer to First Amended Complaint for Patent Infringement and Counterclaims in Case No. C 02-02800 WHA.

(Continued)

*Primary Examiner*—Dung T. Nguyen
(74) *Attorney, Agent, or Firm*—Eric J. Robinson; Robinson Intellectual Property Law Office, P.C.

(57) ABSTRACT

There is disclosed a contact structure for electrically connecting conducting lines formed on a first substrate of an electrooptical device such as a liquid crystal display with conducting lines formed on a second substrate via conducting spacers while assuring a uniform cell gap among different cells if the interlayer dielectric film thickness is nonuniform across the cell or among different cells. A first conducting film and a dielectric film are deposited on the first substrate. Openings are formed in the dielectric film. A second conducting film covers the dielectric film left and the openings. The conducting spacers electrically connect the second conducting film over the first substrate with a third conducting film on the second substrate. The cell gap depends only on the size of the spacers, which maintain the cell gap.

54 Claims, 7 Drawing Sheets

U.S. PATENT DOCUMENTS

| | | | |
|---|---|---|---|
| 4,231,034 | A | 10/1980 | Bechteler |
| 4,600,273 | A | 7/1986 | Ohno |
| 4,640,583 | A | 2/1987 | Hoshikawa et al. |
| 5,005,951 | A | 4/1991 | Te Velde |
| 5,078,475 | A | 1/1992 | Sekimura et al. |
| 5,132,820 | A | 7/1992 | Someya et al. |
| 5,229,644 | A | 7/1993 | Wakai et al. |
| 5,311,342 | A | 5/1994 | Watanabe |
| 5,331,447 | A | 7/1994 | Someya et al. |
| 5,486,941 | A | 1/1996 | Saiuchi et al. |
| 5,528,396 | A | 6/1996 | Someya et al. |
| 5,532,850 | A | 7/1996 | Someya et al. |
| 5,585,951 | A | 12/1996 | Noda et al. |
| 5,619,358 | A | 4/1997 | Tanaka et al. |
| 5,621,556 | A | 4/1997 | Fulks et al. |
| 5,625,474 | A | 4/1997 | Aomori et al. |
| 5,636,329 | A | 6/1997 | Sukegawa et al. |
| 5,708,484 | A | 1/1998 | Someya et al. |
| 5,742,006 | A | 4/1998 | Grupp et al. |
| 5,757,456 | A | 5/1998 | Yamazaki et al. |
| 5,790,212 | A | 8/1998 | Lim |
| 5,811,318 | A | 9/1998 | Kweon |
| 5,825,449 | A | 10/1998 | Shin |
| 5,828,433 | A | 10/1998 | Shin |
| 5,838,399 | A | 11/1998 | Someya et al. |
| 5,889,572 | A | 3/1999 | Takahashi et al. |
| 5,897,188 | A | 4/1999 | Sasuga et al. |
| 5,929,948 | A | 7/1999 | Ohori et al. |
| 5,946,062 | A | 8/1999 | Hasegawa et al. |
| 5,966,594 | A | 10/1999 | Adachi et al. |
| 5,982,471 | A | 11/1999 | Hirakata et al. |
| 6,124,917 | A | 9/2000 | Fujioka et al. |
| 6,177,974 | B1 | 1/2001 | Hirakata et al. |
| 6,219,124 | B1 | 4/2001 | Lee et al. |
| 6,226,059 | B1 | 5/2001 | Yamamoto et al. |
| 6,384,879 | B2 | 5/2002 | Someya et al. |
| 6,404,476 | B1 | 6/2002 | Mase |
| 6,404,480 | B2 | 6/2002 | Hirakata et al. |
| 6,839,098 | B2 | 1/2005 | Someya et al. |
| 6,992,744 | B2 | 1/2006 | Someya et al. |
| 7,196,762 | B2 | 3/2007 | Someya et al. |
| 7,443,478 | B2 | 10/2008 | Hirakata et al. |
| 7,450,210 | B2 | 11/2008 | Someya et al. |
| 2005/0270469 | A1 | 12/2005 | Hirakata et al. |
| 2009/0050890 | A1 | 2/2009 | Hirakata et al. |
| 2009/0061569 | A1 | 3/2009 | Hirakata et al. |

FOREIGN PATENT DOCUMENTS

| | | |
|---|---|---|
| JP | 58-100383 | 7/1983 |
| JP | 58-182685 | 10/1983 |
| JP | 62-204232 | 9/1987 |
| JP | 62-218937 | 9/1987 |
| JP | 01-169430 | 7/1989 |
| JP | 02-000921 | 1/1990 |
| JP | 02-302730 | 12/1990 |
| JP | 03-058024 | 3/1991 |
| JP | 04-083227 | 3/1992 |
| JP | 04-095928 | 3/1992 |
| JP | 04-194910 | 7/1992 |
| JP | 04-350626 | 12/1992 |
| JP | 05-066410 | 3/1993 |
| JP | 05-241183 | 9/1993 |
| JP | 05-243333 | 9/1993 |
| JP | 06-148678 | 5/1994 |
| JP | 06-186579 | 7/1994 |
| JP | 06-250221 | 9/1994 |
| JP | 06-289415 | 10/1994 |
| JP | 06-308510 | 11/1994 |
| JP | 07-199209 | 8/1995 |
| JP | 07-248506 | 9/1995 |
| JP | 07-294944 | 11/1995 |
| JP | 07-301815 | 11/1995 |
| JP | 08-022015 | 1/1996 |
| JP | 08-250745 | 9/1996 |
| JP | 08-254686 | 10/1996 |
| JP | 09-033933 | 2/1997 |
| JP | 09-244055 | 9/1997 |
| JP | 05-243333 | 9/2003 |
| WO | WO 97/06458 | 2/1997 |
| WO | WO 97/10530 | 3/1997 |

OTHER PUBLICATIONS

Acer America Corporation's Answer to First Amended Complaint for Patent Infringement and Counterclaims in Case No. C 02-02800 WHA.

AU Optronics Corporation's Answer to First Amended Complaint for Patent Infringement and Counterclaims in Case No. C 02-02800 WHA.

Preliminary Invalidity Contentions of Acer Incorporated, Acer America Corporation, and AU Optronics Corporation.

Acer Incorporated and Acer America Corporation's Preliminary Proposed Constructions of Identified Claim Terms (Dated: Jan. 27, 2003).

Preliminary Proposed Construction of Identified Claim Terms by AU Optronics Corporation (Dated: Jan. 27, 2003).

SEL's Proposed Preliminary Claim Constructions and Extrinsic Evidence (Jan. 27, 2003).

Joint Claim Construction and Prehearing Statement (Dated: Feb. 3, 2003).

SEL's Opening Brief on Claim Construction and Supporting Evidence (Mar. 4, 2003).

[Proposed] Order on Claim Construction (Mar. 4, 2003).

Declaration of L. Rafael Reif in Support of SEL's Opening Brief on Claim Construction and Supporting Evidence (Mar. 4, 2003).

Declaration of Donald R. Harris in Support of SEL's Opening Brief on Claim Construction and Supporting Evidence (Mar. 4, 2003).

SEL's Amended Opening Brief on Claim Construction and Supporting Evidence (Mar. 4, 2003).

Declaration of Brian D. Henri regarding SEL's Amended Opening Brief on Claim Construction and Supporting Evidence (Mar. 7, 2003).

Acer Incorporated and Acer America Corporation's Opposition Brief on Claim Construction (Mar. 18, 2003).

Declaration of Peter J. Wied in Support of Acer Incorporated and Acer America Corporation's Opposition Brief on Claim Construction (Mar. 18, 2003).

[Proposed] Order Re: Claim Construction (Mar. 18, 2003).

Response of Defendant AU Optronics' to SEL's Amended Opening Brief on Claim Construction and Supporting Evidence (Mar. 19, 2003).

Notice of Filing the Declaration of Virginia Rohrabaugh in Support of the Response of Defendant AU Optronics' to SEL's Amended Opening Brief on Claim Construction and Supporting Evidence and Exhibits (Mar. 19, 2003).

SEL's Reply Brief on Claim Construction and Supporting Evidence (Mar. 26, 2003).

*Corrected* Response of Defendant AU Optronics' to SEL's Amended Opening Brief on Claim Construction and Supporting Evidence (Apr. 7, 2003).

Notice of Filing the Declaration of Virginia Rohrabaugh in Support of the *Corrected* Response of Defendant AU Optronics' to SEL's Amended Opening Brief on Claim Construction and Supporting Evidence and Exhibits (Apr. 7, 2003).

Tentative Claim Construction Order for United States Patent Nos. 5,929,527, 6,355,941, 6,404,476, and 6,404,480 (Apr. 28, 2003).

SEL's Response to the Court's Apr. 28, 2003 Tentative Claim Construction Order (May 5, 2003).

Partial Objection of Defendant AU Optronics Corporation to the Tentative Claim Construction Order for the United States Patent Nos. 5,929,527, 6,355,941, 6,404,476, and 6,404,480 and Request for Modification (May 5, 2003).

Acer Incorporated and Acer America Corporation's Comments on Tentative Claim Construction Order (May 5, 2003).

AU Optronics' Objection to Submission of Improper Extrinsic Evidence to the Court's Apr. 28, 2003 Tentative Claim Construction Order (May 6, 2003).

Expert Witness Response Report of Alan G. Lewis by Paul A. Kohl, Ph.D. of Jun. 6, 2003.

Expert Report of Lloyd L. Zickert in Opposition to Expert Report of Richard A. Killworth, dated Jun. 6, 2003.

Exhibit 1 of Expert Witness Report of Lloyd L. Zickert, Partial Translation of Yamazaki Deposition Exhibit 9.

Exhibit 2 of Expert Witness Report of Lloyd L. Zickert, Yamazaki Deposition Exhibit 9.

Exhibit 3 of Expert Witness Report of Lloyd L. Zickert, '941 Patent.

Exhibit 4 of Expert Witness Report of Lloyd L. Zickert, Yamazaki Deposition Transcript, pp. 79-80 and 88-89 and 150 [and additional pages included in 78-81, 86-89, and 150-153 as attached to the report].

Exhibit 5 of Expert Witness Report of Lloyd L. Zickert, Form 1449 Executed by Examiner of '941 Patent.

Exhibit 6 of Expert Witness Report of Lloyd L. Zickert, Form 1449 Executed by Examiner of '941 Patent.

Exhibit 7 of Expert Witness Report of Lloyd L. Zickert, Examiner's Communication to Board.

Exhibit 8 of Expert Witness Report of Lloyd L. Zickert, Form 1449 Submitted by Applicants in the '264 Application.

Exhibit 9 of Expert Witness Report of Lloyd L. Zickert, Amendment in the '264 Application.

Exhibit 10 of Expert Witness Report of Lloyd L. Zickert, Office Action of Examiner of '264 Application.

Exhibit 11 of Expert Witness Report of Lloyd L. Zickert, JP 55-050663 ('663 application) and 55-050664 ('664 application) Japanese References and Translations.

Exhibit 12 of Expert Witness Report of Lloyd L. Zickert, Appeal Brief in the '941 Patent.

Exhibit 13 of Expert Witness Report of Lloyd L. Zickert, Robinson Deposition Transcript, p. 97 [and additional pages included in 94-97 as attached to the report].

Exhibit 14 of Expert Witness Report of Lloyd L. Zickert, Partial Translation of Matsumura Reference. [*a-Si p-channel FET*, pp. 2, 281-282, Mar. 1980].

Exhibit 15 of Expert Witness Report of Lloyd L. Zickert, Full Translation of Matsumura Reference. [*a-Si p-channel FET*, pp. 2, 281-282, Mar. 1980].

Exhibit 16 of Expert Witness Report of Lloyd L. Zickert, Hirakata et al. Reference [*Contact Structure*, Jun. 11, 2002].

Exhibit 17 of Expert Witness Report of Lloyd L. Zickert, Utility Patent Application Transmittal, Patent Application for U.S. Appl. No. 09/046,658 now U.S. Patent No. 5,982,471.

Exhibit 18 of Expert Witness Report of Lloyd L. Zickert, Request for Patent Drawing Revision, Quinn Patent Drawing Service, for Patent Application for U.S. Appl. No. 09/046,658 now U.S. Patent No. 5,982,471.

Exhibit 20 of Expert Witness Report of Lloyd L. Zickert, Snell Reference. [*Application of Amorphous Silicon Field Effect Transistors in Addressable Liquid Crystal Display Panels*, Applied Physics, 1981].

Exhibit 21 of Expert Witness Report of Lloyd L. Zickert, Matsumura Reference. [*Amorphous-Silicon Integrated Circuit*, Proceedings of the IEEE, vol. 68, No. 10, Oct. 1980].

Exhibit 22 of Expert Witness Report of Lloyd L. Zickert, Matsumura Reference. [*Amorphous-Silicon Image Sensor IC*, IEEE Electron Device Letters, vol. EDL-1, No. 9, Sep. 1980].

Exhibit 23 of Expert Witness Report of Lloyd L. Zickert, '941 Priority Document and Translation. [JP Application 55-88974].

Expert Witness Reply to Opposition Report of Alan G. Lewis by Paul A. Kohl, Ph.D. of Jun. 13, 2003.

Reply Report of Alan G. Lewis of Jun. 13, 2003.

Supplemented Final Invalidity Contentions of AU Optronics Corporation Pursuant to Patent L.R. 3-6(b)(1), dated Aug. 4, 2003.

Appendix 5, Prior Art for Supplemented Final Invalidity Contentions—U.S. Patent No. 6,404,480.

Appendix 6, Claim Charts for Supplemented Final Invalidity Contentions—U.S. Patent No. 6,404,480.

English Translation of JP 8-250745 and JP 8-254686 References in Supplemental Final Invalidity Contentions (Documents No. A632409 to A632461 and attached to a letter dated Aug. 4, 2003, from AU's counsel, Re: AU Optronics Document Production).

Final Claim Construction Order for United States Patent Nos. 5,929,527, 6,355,941, 6,404,476, and 6,404,480.

Final Invalidity Contentions of AU Optronics Corporation.

*Notice of Motion and SEL's Motion for Partial Summary Judgment on Defenses of Defendants; Memorandum of Points and Authorities (Redacted Version)*, Jul. 9, 2003.

*Declaration of Stanley A. Schlitter (Schlitter Declaration) in Support of SEL's Two Motions for Partial Summary Judgment (Redacted Version)*, with Exhibits, Jul. 9, 2003.

Exhibit 2 of Schlitter Declaration, *The Opposition Expert Witness Report of Alan G. Lewis*.

Exhibit 5 of Schlitter Declaration, *Expert Witness Report of Richard A. Killworth*.

Exhibit 6 of Schlitter Declaration, *The Final Claim Construction Order dated Jun. 9, 2003*.

Exhibit 7 of Schlitter Declaration, U.S. Patent No. 6,404,480.

Exhibit 46 of Schlitter Declaration, U.S. Appl. No. 09/046,685, *which Issued as the '471 Patent, and which was the Parent Application to the one that Issued as the '480 Patent*.

Exhibit 47 of Schlitter Declaration, *A Request for Drawings Made by Counsel for SEL to Quinn Patent Drawing Service and the Resulting Drawings from the '471 Patent Application*.

Exhibit 48 of Schlitter Declaration, U.S. Appl. No. 09/734,177, *which Led to the Issuance of the '480 Patent*.

Exhibit 49 of Schlitter Declaration, *A Verified Translation of a Japanese Priority Document from the '480 Patent Application*.

*SEL's Reply in Support of Its Motion for Partial Summary Judgment on Defenses of Defendants*.

Expert Witness Report of Alan G. Lewis of May 22, 2003.

Exhibit 1 of Expert Witness Report of Alan G. Lewis, I-W Wu et al., "Processing and Device Performance of Low-Temperature CMOS Poly-TFTs on 18.4 inch Diagonal Substrates for AMLCD Applications," Technical Digest of the Society for Information Display International Symposium, 1992, pp. 615-618.

Exhibit 2 of Expert Witness Report of Alan G, Lewis, J. Gluek et al., "Improvement in Light Efficiency of a Si:H TFT Addressed Reflective λ/4—HAN—Mode Light Valves for Color TV Projection," Technical Digest of the Society for Information Display International Symposium, 1993, pp. 299-302.

Exhibit 3 of Expert Witness Report of Alan G. Lewis, Y. Takafuji et al., "A 1.9-in. 1.5-Mpixel Driver Fully Integrated Poly-Si TFT LCD for HDTV Projection," Technical Digest of the Society for Information Display International Symposium, 1993, pp. 383-386.

Exhibit 4 of Expert Witness Report of Alan G. Lewis, H. Ohsihima et al., "Full Color LCDs with Completely Integrated Drivers Utilizing Low-Temperature Poly-Si TFTs," Technical Digest of the Society for Information Display International Symposium, 1993, pp. 387-390.

Exhibit 5 of Expert Witness Report of Alan G. Lewis, M. Kobayashi et al., "High Mobility Poly-Si TFTs with Tungsten-Polycide Gate for 1.9 Mpixel HDTV LCD Projector," Technical Digest of the Society for Information Display International Symposium, 1994, pp. 75-78.

Exhibit 6 of Expert Witness Report of Alan G. Lewis, M. Matsuo et al., "1.3-in. Full-Color VGA Poly-Si TFT LCDs with Completely Integrated Drivers," Technical Digest of the Society for Information Display International Symposium, 1994, pp. 87-90.

Exhibit 7 of Expert Witness Report of Alan G. Lewis, K.R. Sarma et al., "Silicon on Quartz (SOQ) for High-Resolution Liquid Crystal Light Valves," Technical Digest of the Society for Information Display International Symposium, 1994, pp. 419-422.

Exhibit 8 of Expert Witness Report of Alan G. Lewis, T. Little et al., "A 9.5 inch, 1.3 Mega Pixel Low Temperature Poly-Si TFT LCD Fabricated by SPC of Very Thin Films and an ECR-CVD Gate Insulator," 1994 International Display Research Conference, pp. 219-222.

Exhibit 9 of Expert Witness Report of Alan G. Lewis, T. Hashizume et al., "14µm Pixel Poly-Si LCD with Integrated Drivers for Full Color VGA Panel," 1994 International Display Research Conference, pp. 418-421.
Exhibit 10 of Expert Witness Report of Alan G. Lewis, C.W. Kim et al., "Pure Al and Al-Alloy Gate Line Processes in TFT LCDs," Technical Digest of the Society for Information Display International Symposium, 1996, pp. 337-340.
Exhibit 11 of Expert Witness Report of Alan G. Lewis, T. Ohori et al., "Low-Temperature Poly-Si SXGA TFT LCDs with Monolithic Drivers," Technical Digest of the Society for Information Display International Symposium, 1996, pp. 673-676.
Exhibit 12 of Expert Witness Report of Alan G. Lewis, H.C. Huang et al., "Planarization of Liquid Crystal on Silicon Projection Display with Multilevel Metallization and Chemical-Mechanical Polishing," Technical Digest of the Society for Information Display International Symposium, 1996, pp. 685-688.
Exhibit 13 of Expert Witness Report of Alan G. Lewis, A. Lewis et al., "Driver Circuits for AMLCDs," 1994 International Display Research Conference, pp. 56-63.
Exhibit 14 of Expert Witness Report of Alan G. Lewis, Fulks et al., "Method of Manufacturing Active Matrix LCD Using Five Masks," U.S. Patent 5,621,556, 1997.
Exhibit 15 of Expert Witness Report of Alan G. Lewis, A. Lewis, "Low Power Display Technology for Portable Systems," Short Course presented at the 1995 International Electron Devices Meeting, Washington, D.C.
Exhibit 16 of Expert Witness Report of Alan G. Lewis, B.H. Lim, "Thin Film Transistor Liquid Crystal Display Having Test Pads," U.S. Patent 5,790,212, 1998.
Exhibit 17 of Expert Witness Report of Alan G. Lewis, S. Yamazaki et al., "Display Device and Method of Fabricating Involving Peeling Circuits From One Substrate and Mounting on Another," U.S. Patent 5,757,456, 1998.
Exhibit 18 of Expert Witness Report of Alan G. Lewis, International Application No. WO97/10530 translation of K. Yanagawa et al., "Active Matrix Liquid Crystal Display," U.S. Patent 6,266,117, 2001.
Exhibit 19 of Expert Witness Report of Alan G. Lewis, T. Kaneshiro et al., "Liquid Crystal Display Panel," Patent Application Publication H 9-33933, 1997.
Exhibit 20 of Expert Witness Report of Alan G. Lewis, T. Furushima, "Liquid Crystal Display Unit," Patent Application Publication H 5-241183, 1993.
Exhibit 21 of Expert Witness Report of Alan G. Lewis, M. Furuno, "Semiconductor Display Device and Manufacturing Method Thereof," Patent Application Publication H 7-301815, 1997.
Exhibit 22 of Expert Witness Report of Alan G. Lewis, K. Kitawada, "Liquid Crystal Display Device," Patent Application Publication H 6-289415, 1994.
Exhibit 23 of Expert Witness Report of Alan G. Lewis, A. Lewis et al., "AMLCDs for Military Avionics," Silver Associates Short Course, London, Apr. 1999.
Exhibit 24 of Expert Witness Report of Alan G. Lewis, J. Fowler et al., "Avionics Color Display Using LCD Projection Technology," Technical Digest of the Society for Information Display International Symposium, 1992, pp. 912-915.
Exhibit 25 of Expert Witness Report of Alan G. Lewis, Oct. 19, 1992 edition of Channel Magazine.
Exhibit 26 of Expert Witness Report of Alan G. Lewis, U.S. Patent 6,404,480.
Exhibit 27 of Expert Witness Report of Alan G. Lewis, Prosecution History for U.S. Patent 6,404,480.
Expert Witness Report of Richard A. Killworth of May 22, 2003.
Reference 1 of Expert Witness Report of Richard A. Killworth, U.S. Patent No. 6,355,941.
Reference 2 of Expert Witness Report of Richard A. Killworth, May 1, 2003 Yamazaki Deposition Transcript (pp. 141-150).
Reference 3 of Expert Witness Report of Richard A. Killworth, Yamazaki Deposition Exhibit 9.
Reference 4 of Expert Witness Report of Richard A. Killworth, Yamazaki Deposition Exhibit 10.
Reference 5 of Expert Witness Report of Richard A. Killworth, Apr. 30, 2003 Yamazaki Deposition Transcript (pp. 80-81).
Reference 6 of Expert Witness Report of Richard A. Killworth, Information Disclosure Statement (SEL 00962-SEL 00963) and PTO Form 1449 (SEL 00963).
Reference 7 of Expert Witness Report of Richard A. Killworth, Jul. 16, 1999 Office Action (SEL 00978-SEL 00979).
Reference 8 of Expert Witness Report of Richard A. Killworth, May 14, 2003 Robinson Deposition Transcript (pp. 29-58).
Reference 9 of Expert Witness Report of Richard A. Killworth, PTO Appeal Brief (SEL 00891-SEL 00908).
Reference 10 of Expert Witness Report of Richard A. Killworth, PTO Board Ruling (SEL 00999).
Reference 11 of Expert Witness Report of Richard A. Killworth, Oct. 10, 1995 Supplemental Information Disclosure Statement (SEL 00683-SEL 00692).
Reference 12 of Expert Witness Report of Richard A. Killworth, Partial Translation of National Convention Record (SEL 59441).
Reference 13 of Expert Witness Report of Richard A. Killworth, U.S. Patent No. 6,404,480.
Reference 14 of Expert Witness Report of Richard A. Killworth, May 15, 2003 Hirakata Deposition Transcript (p. 41).
Exhibit 1 of Expert Witness Report of Richard A. Killworth, Curriculum Vitae.
Exhibit 2 of Expert Witness Report of Richard A. Killworth, Illustration of Violation of the Best Mode Requirement of 35 USC 112 in the '941 Patent.
Exhibit 3 of Expert Witness Report of Richard A. Killworth, Illustration of Examiner's Non-consideration of Material Prior Art in the '941 Patent, Namely Japanese Patents 55-050663 and 55-050664.
Exhibit 4 of Expert Witness Report of Richard A. Killworth, Illustration of Information Inconsistent with Positions Taken by '941 Patent Applicants.
Exhibit 5 of Expert Witness Report of Richard A. Killworth, Illustration of Misrepresentations Made During the Prosecution of the '480 Patent.
Notice of Motion and Motion for Partial Summary Judgment, Pursuant to Fed.R.Civ.P. Rule 56(b), (c) and (d) That Plaintiff is Not Entitled to Rely on a Date of Conception for the '480 Patent Prior to Mar. 27, 1997, the Date of Filing the Related Japanese Patent Application No. 9-094606; Memorandum of Points and Authorities in Support Thereof, Jul. 9, 2003.
Declaration of Minda R. Schechter in Support of Defendants' Memorandum of Law in Support of its Motion for Partial Summary Judgment, Pursuant to Fed.R.Civ.P. Rule 56(b), (c), and (d) That Plaintiff is Not Entitled to Rely on a Date of Conception for the '480 Patent Prior to Mar. 27, 1997, the Date of Filing the Related Japanese Patent Application No. 9-094606; Jul. 9, 2003.
Exhibit 1 of Declaration of Minda R. Schechter, a true and correct U.S. Patent 6,404,480.
Exhibit 2 of Declaration of Minda R. Schechter, a true and correct Japanese Patent Application 9-094606.
Exhibit 3 of Declaration of Minda R. Schechter, a true and correct Verified Translation of Japanese Patent Application 9-094606.
Exhibit 5 of Declaration of Minda R. Schechter, a true and correct two-page document, dated Jan. 11, 1997 (Bates Nos. SEL 08609-08610).
Exhibit 6 of Declaration of Minda R. Schechter, a translation of the two-page document dated Jan. 11, 1997 attached on Exhibit 5.
Exhibit 7 of Declaration of Minda R. Schechter, Final Invalidity Contentions of AU Optronics Corporation, Jun. 20, 2003.
Exhibit 8 of Declaration of Minda R. Schechter, a true and correct U.S. Patent No. 5,982,471.
Exhibit 10 of Declaration of Minda R. Schechter, a true and correct pp. 186-193 of the May 1, 2003 Deposition Transcript of Shumpei [sic] Yamazaki.
Exhibit 11 of Declaration of Minda R. Schechter, a true and correct pp. 14, and 20-26 of the May 15, 2003 Deposition Transcript of Yoshiharu Hirakata.
Exhibit 12 of Declaration of Minda R. Schechter, a true and correct the Declaration of Yuko Ikegami Authenticating the Translation of Japanese Language Document Produced by SEL Bates No. SEL 08609-08610 Attached to Exhibit 6.
SEL's Opposition to AU's Motion for Partial Summary Judgment that Plaintiff is not Entitled to Rely on a Date of Conception for the '480 Patent Prior to Mar. 27, 1997, the Date of Filing the Related Japanese Patent Application No. 9-094606.
Declaration of Yoshiharu Hirakata in Support of SEL's Opposition to AU's Motion for Partial Summary Judgment that Plaintiff is not Entitled to Rely on a Date of Conception for the '480 Patent Prior to Mar. 27, 1997, the Date of Filing the Related Japanese Patent Application No. 9-094606, Jul. 23, 2003.
AU Optronics' Reply to SEL's Opposition to AU Optronics Motion for Partial Summary Judgment, That Plaintiff is not Entitled to Rely on a Date of Conception for the '480 Patent Prior to Mar. 27, 1997, the Date of Filing the Related Japanese Patent Application No. 9-094606, Jul. 30, 2003.
Declaration of Minda R. Schechter in Support of Defendant AUO's Reply to SEL's Opposition to AUO's Motion for Partial Summary Judgment, Pursuant to Fed.R.Civ.P. Rule 56(b), (c) and (d) that Plaintiff is Not Entitled to Rely on a Date of Conception for the '480 Patent Prior to Mar. 27, 1997, the Date of Filing the Related Japanese Patent Application No. 9-094606, Jul. 30, 2003.
Exhibit 1 of Declaration of Minda R. Schechter, Letter dated Mar. 25, 2003 from Terrence J. Truax, Jenner & Block, LCC to Laurence H. Pretty, Hogan & Hartson, LLP, regarding *SEL v. Acer Incoporated*, et al., Case No. C 02-2800 WHA.
Exhibit 2 of Declaration of Minda R. Schechter, Letter dated Apr. 9, 2003 from Laurence H. Pretty, Hogan & Hartson, LLP, to Terrence J. Truax, Jenner & Block, LCC, regarding *Semiconductor Energy Laboratory Company, Ltd v. ACER Incorporated et al*.
Exhibit 3 of Declaration of Minda R. Schechter, Letter dated Apr. 24, 2003 from Terrence J. Truax, Jenner & Block, LCC to Laurence H. Pretty, Hogan & Hartson, LLP, regarding *SEL v. Acer Incoporated*, et al., Case No. C 2-2800 WHA.
Exhibit 4 of Declaration of Minda R. Schechter, Letter dated May 21, 2003 from Joseph F. Marinelli, Jenner & Block, to Minda R. Schechter, Hogan & Hartson, LLP, Documents bearing Bates Nos. SEL 072670 to SEL 073980; Letter dated May 22, 2003, from Terrence J. Truax, Jenner & Block, to Laurence H. Pretty, Hogan & Hartson, LLP regarding *SEL v Acer Incorporated*, et al, Case No. C 2-2800 WHA; Letter dated May 23, 2003 (facsimile date) from Joseph A. Saltiel, Jenner & Block, to Laurence H. Pretty, Hogan & Hartson, LLP regarding *Semiconductor Energy Laboratory Company, Ltd. v. Acer Incorporated*, et al; Letter dated Jun. 30, 2003 from Joseph F. Marinelli, Jenner & Block, to William H. Wright, Hogan & Hartson, LLP and Peter J. Wied, Alschuler, Grossman, Stein & Kahan LLP regarding *SEL v. Acer Incorporated*, et al, Case No. C 02-2800 WHA.
Exhibit 5 of Declaration of Minda R. Schechter, Final Invalidity Contentions of AU Optronics Corporation.
Exhibit 1 of Exhibit 5 of Declaration of Minda R. Schechter, Appendix 1, Prior Art for Final Invalidity Contentions—U.S. Patent No. 5,929,527.
Exhibit 2 of Exhibit 5 of Declaration of Minda R. Schechter, Appendix 2, Claim Charts for Final Invalidity Contentions—U.S. Patent No. 5,929,527.
Exhibit 3 of Exhibit 5 of Declaration of Minda R. Schechter, Appendix 3, Prior Art for Final Invalidity Contentions—U.S. Patent No. 6,355,941.
Exhibit 4 of Exhibit 5 of Declaration of Minda R. Schechter, Appendix 4, Charts for Final Invalidity Contentions—U.S. Patent No. 6,355,941.
Exhibit 5 of Exhibit 5 of Declaration of Minda R. Schechter, Appendix 5, Prior Art for Final Invalidity Contentions—U.S. Patent No. 6,404,480.
Exhibit 6 of Exhibit 5 of Declaration of Minda R. Schechter, Claim Charts for Final Invalidity Contentions—U.S. Patent No. 6,404,480.
Official Action dated Dec. 1, 2004 for U.S. Appl. No. 10/125,394.
Defendant Chi Mei Optoelectronics Corp.'s Answer to Complaint for Patent Infringement, Demand for Jury Trial, Counterclaim, and Certification of Interested Parties Dated Feb. 28, 2005.
Defendant Westinghouse Digital Electronics, LLC's Answer to Complaint for Patent Infringement, and Certification of Interested Parties Dated Feb. 28, 2005.
Defendant International Display Technology Co., Ltd.'s Answer to Complaint for Patent Infringement, and Certification of Interested Parties Dated Feb. 28, 2005.

Defendant International Display Technology USA, Inc.'s Answer to Complaint, and Certification of Interested Parties Dated Feb. 28, 2005.
Defendant Chi Mei Optoelectronics Corp.'s Responses to Plaintiff Semiconductor Energy Laboratory Co., Ltd.'s First Set of Interrogatories Dated Apr. 4, 2005.
Complaint for Patent Infringement, and Demand for Jury Trial, *Semiconductor Energy Laboratory Co., Ltd.*, Plaintiff vs. *Chi Mei Optoelectronics Corp.*, International Display Technology Co., Ltd., International Display Technology USA, Inc., Westinghouse Digital Electronics, LLC and CTX Technology Corp., Defendants dated Nov. 3, 2004.
Opposition Expert Witness Report of Alan G. Lewis, Jun. 5, 2003.
Exhibit 1 of Opposition Expert Witness Report of Alan G. Lewis, Deposition transcript of Chang-Cheng Lo, with exhibits, Jun. 5, 2003.
Exhibit 2 of Opposition Expert Witness Report of Alan G. Lewis, Deposition transcript of Hsu-Ping Tseng, with exhibits, Jun. 5, 2003.
Defendant's Final Invalidity Contentions and Accompanying Document Production dated Aug. 28, 2006.
Defendant's Preliminary Invalidity Contentions and Accompanying Document Production dated Jun. 6, 2005.
Revised Exhibits C-2, C-4, C-6, C-8, C-9 and C-10 to Defendants' Preliminary Invalidity Contentions dated Jun. 14, 2005.
Defendant's Preliminary Proposed Claim Constructions and Preliminary Identification of Extrinsic Evidence Pursuant to Patent L.R. 4-2 dated Jul. 22, 2005, including Exhibits A-L attached thereto.
Semiconductor Energy Laboratory Co., Ltd's Proposed Preliminary Claim Construction and Extrinsic Evidence dated Jul. 22, 2005.
Semiconductor Energy Laboratory Co. Ltd.'s Patent L.R. 4-2(b) Disclosure dated Jul. 22, 2005 including documents bates numbered as SEL-CMO 89041-89049.
Joint Claim Construction and Prehearing Statement dated Aug. 5, 2005.
Semiconductor Energy Laboratory Co., Ltd.'s Opening Brief on Claim Construction and Supporting Evidence dated Sep. 20, 2005.
Declaration of Donald R. Harris in Support of Semiconductor Energy Laboratory Co., Ltd.'s Opening Brief on Claim Construction dated Sep. 20, 2005 including Exhibits 1-12.
Defendants' Claim Construction Response Brief dated Oct. 4, 2005.
Declaration of Scott R. Mosko in Support of Defendants' Claim Construction Response Brief dated Oct. 4, 2005 including Exhibits A-X.
Semiconductor Energy Laboratory Co., Ltd.'s Reply Brief on Claim Construction and Supporting Evidence dated Oct. 11, 2005.
Declaration of Donald R. Harris in Support of Semiconductor Energy Laboratory Co., Ltd.'s Reply Brief on Claim Construction dated Oct. 11, 2005 including Exhibits 14-18.
Order Granting Ex Parte Reexamination dated May 12, 2006 for U.S. Appl. No. 90/007,985.
Official Action for U.S. Appl. No. 10/125,394 to Hirakata dated Dec. 29, 2005.
Memorandum & Order, Claim Construction, Mar. 24, 2006, U.S. District Court, Northern District of California, *Semiconductor Energy Laboratory Co., Ltd. v. Chi Mei Optoelectronics Corp.*, et al., No. C 04-04675 MHP.
Defendant Chi Mei Optoelectronics Corp.'s Notice of Motion and Motion for Clarification of the Court's Claim Construction Order Regarding U.S. Patent Nos. 6,404,480 and 6,756,258; Memorandum of Points and Authorities in Support Thereof dated Jun. 9, 2006, *Semiconductor Energy Laboratory Co., Ltd. v. Chi Mei Optoelectronics Corp.*, et al., No. C 04-04675 MHP, 9 pages.
Plaintiff Semiconductor Energy Laboratory Co. Ltd.'s Memorandum of Points and Authorities in Support of Its Opposition to CMO's Motion for Clarification of the Court's Claim Construction Order dated Jun. 26, 2006, *Semiconductor Energy Laboratory Co., Ltd. v. Chi Mei Optoelectronics Corp.*, et al., No. C 04-04675 MHP, 10 pages.
Defendant Chi Mei Optoelectronics Corp.'s Reply Memorandum in Support of Its Motion for Clarification dated Jun. 29, 2006, *Semiconductor Energy Laboratory Co., Ltd. v. Chi Mei Optoelectronics Corp.*, et al., No. C 04-04675 MHP, 8 pages.

Memorandum & Order Re: Motion for Clarification dated Jul. 28, 2006, *Semiconductor Energy Laboratory Co., Ltd.* v. *Chi Mei Optoelectronics Corp.*, et al., No. C 04-04675 MHP, 3 pages.

Declaration of Stanley A. Schlitter in Support of Semiconductor Energy Laboratory Co., Ltd.'s Opposition to CMO's Motion for Summary Judgment of Non-Infringement and Invalidity of Claims 1, 2, 4, 5, 11, 12, 14 and 15 of U.S. Patent No. 6,404,480 dated Jan. 9, 2007.

Declaration of Paul A. Kohl, Ph.D. in Support of Semiconductor Energy Laboratory Co., Ltd.'s Opposition to CMO's Motion for Summary Judgment of Non-Infringement and Invalidity of Claims 1, 2, 4, 5, 11, 12, 14 and 15 of U.S. Patent No. 6,404,480 dated Jan. 9, 2007.

Defendant Chi Mei Optoelectronics Corp.'s First Amended Answer to Complaint for Patent Infringement, Demand for Jury Trial, Counterclaim, and Certification of Interested Parties dated Nov. 9, 2006.

Semiconductor Energy Laboratory Co. Ltd.'s Opposition to CMO's Motion for Summary Judgment of Non-Infringement and Invalidity of Claims 1, 2, 4, 5, 11, 12, 14 and 15 of U.S. Patent No. 6,404,480 dated Jan. 9, 2007.

Memorandum & Order Re: Defendants' Motion for Summary Judgment dated Apr. 17, 2007.

Memorandum & Order Re: Motions for Summary Judgment dated Jun. 19, 2007.

Defendant Chi Mei Optoelectronics Corp.'s Reply in Support of its Motion for Summary Judgment of Non-Infringement and Invalidity of Claims 1,2, 4, 5, 11, 12, 14 and 15 of U.S. Patent No. 6,404,480 dated Jan. 18, 2007.

Declaration of Ryan E. Lindsey in Support of CMO's Reply in Support of Its Motion for Summary Judgment of U.S. Patent No. 6,404,480 dated Jan. 18, 2007.

Expert Report of the Honorable Gerald J. Mossinghoff and accompanying documents dated Oct. 16, 2006.

Expert Report of Dan Schott and accompanying documents dated Oct. 16, 2006.

Expert Report of Professor Martin Adelman and accompanying documents dated Nov. 14, 2006.

Expert Witness Rebuttal Report of Paul A. Kohl, Ph.D. dated Nov. 14, 2006.

Defendant Chi Mei Optoelectronics Corp.'s Notice of Motion and Motion for Summary Judgment of Non-Infringement and Invalidity of Claims 1, 2, 4, 5, 11, 12, 14 and 15 of U.S. Patent 6,404,480 dated Nov. 14, 2006.

Joint Motion Requesting Court to Vacate Order on Summary Judgment of (I) Invalidity of U.S. Patent No. 6,756,258 as to Obviousness and (II) Infringement of U.S. Patent No. 6,404,480 dated Jul. 5, 2007.

[Proposed] Order Granting Joint Motion Requesting Court to Vacate Order on Summary Judgment of (I) Invalidity of U.S. Patent No. 6,756,258 as to Obviousness and (II) Infringement of U.S. Patent No. 6,404,480 dated Jul. 5 2007.

Rule 41 Stipulation of Dismissal dated Jul. 6, 2007.

Order Granting Joint Motion Requesting Court to Vacate Order on Summary Judgment of (I) Invalidity of U.S. Patent No. 6,756,258 as to Obviousness and (II) Infringement of U.S. Patent No. 6,404,480 dated Jul. 6, 2007.

Exhibit 19 of Expert Witness Report of Lloyd L. Zickert, Powell Reference (Amorphous Silicon-Silicon Nitride Thin-Film Transistors, 15, May 1981).

Office Action for U.S. Appl. No. 90/007,985 dated Jul. 10, 2007.

Office Action for U.S. Appl. No. 11/199,125 dated Jan. 4, 2006.

Specification, claims, abstract and drawings for U.S. Appl. No. 10/125,394, filed Apr. 19, 2002.

Specification, claims, abstract and drawings for U.S. Appl. No. 11/199,125, filed Aug. 9, 2005.

Specification, claims, abstract and drawings for U.S. Appl. No. 11/199,135, filed Aug. 9, 2005.

Semiconductor Energy Laboratory Co., Ltd.'s Motion for Summary Judgment on its Claim of Infringement of the '480 Patent and on Defendants' Inequitable Conduct, Laches, License, and Patent Misuse Affirmative Defenses dated Mar. 19, 2007.

Declaration of Stanley A. Schlitter in Support of Semiconductor Energy Laboratory Co., Ltd.'s Motion for Summary Judgment dated Mar. 19, 2007.

Defendants' Opposition to Semiconductor Energy Laboratory Co., Ltd.'s Motion for Summary Judgment on its Claim of Infringement of the '480 Patent and on Defendants' Inequitable Conduct, Laches, License, and Patent Misuse Affirmative Defenses dated Apr. 16, 2007.

Declaration of Robert W. Unikel in Support of Defendants' Opposition to Semiconductor Energy Laboratory Co., Ltd.'s Motion for Summary Judgment on its Claim of Infringement of the '480 Patent and on Defendants' Inequitable Conduct, Laches, License, and Patent Misuse Affirmative Defenses dated Apr. 16, 2007.

Semiconductor Energy Laboratory Co., Ltd.'s Reply in Support of its Motion for Summary Judgment on its Claim of Infringement of the '480 Patent and on Defendants' Inequitable Conduct, Laches, License, and Patent Misuse Affirmative Defenses dated Apr. 30, 2007.

Declaration of Stanley A. Schlitter in Support of Semiconductor Energy Laboratory Co., Ltd.'s Reply in Support of its Motion for Summary Judgment dated Apr. 30, 2007.

Defendant Chi Mei Optoelectronics Corp.'s Notice of Motion and Motion for Leave to File a Supplemental Opposition to Semiconductor Energy Laboratory Co., Ltd.'s Motion for Summary Judgment on its Claim of Infringement of the '480 Patent dated May 17, 2007.

Semiconductor Energy Laboratory Co., Ltd.'s Opposition to Defendant Chi Mei Optoelectronics Corp.'s Motion for Leave to File a Supplemental Opposition dated May 21, 2007.

Declaration of Stanley A. Schlitter in Support of Semiconductor Energy Laboratory Co., Ltd.'s Opposition to Defendant Chi Mei Optoelectronics Corp.'s Motion for Leave to File a Supplemental Opposition dated May 21, 2007.

Office Action (Japanese Patent Application No. 2006-001931) Dated Dec. 25, 2007.

12 PIXEL REGION    16 COMMON CONTACT PORTION ness t of the interlayer dielectric film 18, the cell gap $G_c$ in the
CONTACT STRUCTURE

BACKGROUND OF THE INVENTION

1. Field of the Invention

The present invention relates to a contact structure for electrically connecting together conducting lines formed on two opposite substrates, respectively, via conducting spacers and, more particularly, to a contact structure used in common contacts of an electrooptical device such as a liquid crystal display.

2. Description of the Related Art

In recent years, liquid crystal displays have been extensively used in the display portions of mobile intelligent terminals such as mobile computers and portable telephones including PHS (personal handyphone system). Also, active-matrix liquid crystal displays using TFTs as switching elements are well known.

A liquid crystal display comprises two substrates and a liquid crystal material sealed between them. Electrodes are formed on these two substrates to set up electric fields. A desired image or pattern is displayed by controlling the magnitudes of these electric fields. In the active-matrix liquid crystal display, TFTs (thin-film transistors) are formed on one substrate to control the supply of voltage to each pixel electrode. Therefore, this substrate is referred to as the TFT substrate. A counter electrode placed opposite to the pixel electrodes is formed on the other substrate and so it is referred to as the counter substrate.

In the active matrix display, an electric field is produced between each pixel electrode on the TFT substrate and the counter electrode on the counter substrate, thus providing a display. The potential at each pixel electrode on the TFT substrate is controlled by the TFT and thus is varied. On the other hand, the counter electrode on the counter substrate is clamped at a common potential. For this purpose, the counter electrode is connected with an extractor terminal via a common contact formed on the TFT substrate. This extractor terminal is connected with an external power supply. This connection structure clamps the counter electrode at the common potential.

The structure of the common contact of the prior art active-matrix liquid crystal display is next described briefly by referring to FIGS. 12-14.

FIG. 12 is a top plan view of a TFT substrate 10. This TFT substrate comprises a substrate 11 having a pixel region 12, a scanning line driver circuit 13, and a signal line driver circuit 14. In the pixel region 12, pixel electrodes and TFTs connected with the pixel electrodes are arranged in rows and columns. The scanning line driver circuit 13 controls the timing at which each TFT is turned on and off. The signal line driver circuit 14 supplies image data to the pixel electrodes. Furthermore, there are extractor terminals 15 to supply electric power and control signals from the outside. The substrate 11 makes connection with the counter electrode at common contact portions 16a-16d.

FIG. 13 is a cross-sectional view of the pixel region 12 and a common contact portion 16 representing the common contact portions 16a-16d. A TFT 17 and many other TFTs (not shown) are fabricated in the pixel region 12 on the substrate 11. An interlayer dielectric film 18 is deposited on the TFT 17. A pixel electrode 19 connected with the drain electrode of the TFT 17 is formed on the interlayer dielectric film 18.

A precursor for the source and drain electrodes of the TFT 17 is patterned into internal conducting lines 21 at the common contact portion 16. The interlayer dielectric film 18 is provided with a rectangular opening. A conducting pad 22 is formed in this opening and connected with the internal conducting lines 21. The pixel electrode 19 and the conducting pad 22 are patterned from the same starting film.

FIG. 14 is a top plan view of the known common contact portion 16. A region located inside the conducting pad 22 and indicated by the broken line corresponds to the opening formed in the interlayer dielectric film 18.

As shown in FIG. 13, a counter electrode 24 consisting of a transparent conducting film is formed on the surface of a counter substrate 23. This counter electrode 24 is opposite to the pixel electrodes 19 in the pixel region 12 and to the conducting pad 22 at the common contact portion 16.

Spherical insulating spacers 25 are located in the pixel region 12 to maintain the spacing between the substrates 11 and 23. A spherical conducting spacer 26 is positioned at the common contact portion 16 and electrically connects the counter electrode 24 with the conducting pad 22. The pad 22 is electrically connected with the internal conducting lines 21, which in turn are electrically connected with an extractor terminal 15. This connection structure connects the counter electrode 24 on the counter substrate 23 with the extractor terminal 15 on the substrate 11.

In the prior art liquid crystal display, the interlayer dielectric film 18 is provided with the opening at the common contact portion 16, as shown in FIG. 13. Therefore, the cell gap $G_c$ in the common contact portion is almost equal to the sum of the cell gap $G_p$ in the pixel region+the film thickness t of the interlayer dielectric film 18.

The cell gap $G_p$ (also known as the cell spacing) in the pixel region 12 is determined by the insulating spacers 25. It is common practice to use standardized spacers as the insulating spacers 25 and so if the spacers 25 have a uniform diameter, the cell gap $G_p$ in the pixel region 12 is substantially uniform among liquid-crystal cells. However, it is difficult to avoid nonuniformity of the cell gap $G_c$ in the common contact portion among liquid-crystal cells.

The cell gap $G_c$ in the common contact portion is constant since the cell gap $G_p$ is constant because of the relation described above. Therefore, the cell gap $G_c$ in the common contact portion depends only on the film thickness t of the interlayer dielectric film 18. Consequently, to make the cell gap $G_c$ uniform among liquid-crystal cells, it is necessary that the film thickness t of this interlayer dielectric film 18 be uniform among cells. However, this is impossible to circumvent.

Normally, the common contact portions of the liquid crystal display are 2 to 4 in number. The film thickness t of the interlayer dielectric film 18 may differ from location to location on the same substrate. In this case, the film thickness t may differ among different common contacts even on the same substrate.

Because of the aforementioned nonuniformity of the thickness t of the interlayer dielectric film 18, the cell gap $G_c$ in the common contact portion differs among different cells or different common contacts. Furthermore, the nonuniformity of the cell gap $G_c$ results in the cell gap $G_p$ in the pixel region to be nonuniform.

The cell gap $G_p$ in the pixel region is affected more by the nonuniformity of the cell gap $G_c$ in the common contact portion as the area of the pixel region 12 becomes narrower than the area of the common contact portion. Especially, in the case of a projection display as used in a projector, the problem of above-described nonuniformity of the cell gap $G_p$ in the pixel region becomes conspicuous, because it is a quite accurate small-sized display of about 1 to 2 inches.

A standardized spacer is also used as the conducting spacer 26. The diameter of this conducting spacer 26 is determined by the diameter of the insulating spacers 25 in the pixel region 12 and by the design thickness of the interlayer dielectric film 18. Where the thickness of the interlayer dielectric film 18 is much larger than the designed value, the cell gap $G_c$ in the common contact portion becomes very large. This makes it impossible to connect the counter electrode with the conducting pad well by the conducting spacer 26. In consequence, the counter electrode cannot be clamped at the common potential. As a result, a display cannot be provided.

SUMMARY OF THE INVENTION

It is an object of the present invention to provide a contact structure which is free of the foregoing problems, provides less nonuniform cell gap among different cells if the thickness of the interlayer dielectric film is nonuniform across the cell or among different cells, and reduces poor electrical contacts which would normally be caused by conducting spacers.

This object is achieved in accordance with the teachings of the invention by a contact structure for connecting a conducting film formed on a first substrate with a conducting film formed on a second substrate opposite to the first substrate, the contact structure comprising: a cell gap defined between the first and second substrates; a first conducting film formed on the first substrate; a dielectric film covering the first conducting film; openings formed in the dielectric film to expose parts of the first conducting film by selectively leaving the dielectric film; a second conducting film covering the dielectric film left and the openings; a third conducting film formed on the second substrate; and conducting spacers held between the first and second substrates and connecting the second and third conducting films. The second conducting film is connected with the first conducting film through the openings. The second conducting film, the conducting spacers, and the third conducting film are connected in turn on the dielectric film left. The conducting spacers maintain the cell gap between the first and second substrates.

One embodiment of the invention resides in a contact structure for connecting a conducting film formed on a first substrate with a conducting film formed on a second substrate opposite to the first substrate, the contact structure comprising: a cell gap defined between the first and second substrates; a first conducting film formed on the first substrate; a dielectric film covering the first conducting film; openings formed in the dielectric film to expose parts of the first conducting film; an insulator deposited on only portions of the first conducting film exposed through the openings; a second conducting film covering the openings; a third conducting film formed on the second substrate; and conducting spacers held between the first and second substrates and connecting the second and third conducting films. The second conducting film is connected with the first conducting film through the openings extending through the insulator. The second conducting film, the conducting spacers, and the third conducting film are connected in turn through the openings extending through the insulator. The conducting spacers maintain the cell gap between the first and second substrates.

Another embodiment of the invention resides in a contact structure for connecting a conducting film formed on a first substrate of an electrooptical device with a counter electrode formed on a second substrate opposite to the first substrate, which has pixel electrodes formed thereover, the contact structure comprising: a cell gap defined between the first and second substrates; a first conducting film formed on the first substrate and under the pixel electrodes; an interlayer dielectric film covering the first conducting film; openings formed in the interlayer dielectric film to expose parts of the first conducting film by selectively leaving the interlayer dielectric film; a second conducting film defining the counter electrode formed on the second substrate; a third conducting film covering the interlayer dielectric film left and the openings; and conducting spacers held between the first and second substrates and connecting the second and third conducting films. The second conducting film is connected with the first conducting film through the openings. The third conducting film and the pixel electrodes are formed from a common starting film. The second conducting film, the conducting spacers, and the third conducting film are connected in turn on the dielectric film left. The conducting spacers maintain the spacing between the first and second substrates.

A further embodiment of the invention resides in a contact structure for connecting a first conducting film formed over a first substrate of an electrooptical device with a counter electrode formed on a second substrate opposite to the first substrate, which has pixel electrodes formed thereon, the contact structure comprising: a cell gap defined between the first and second substrates; a first conducting film formed on the first substrate and under the pixel electrodes; an interlayer dielectric film covering the first conducting film; openings formed in the interlayer dielectric film to expose parts of the first conducting film; an insulator formed on selected portions of the surface of the first conducting film extending through the openings; a second conducting film covering the openings; a third conducting film defining the counter electrode formed on the second substrate; conducting spacers held between the first and second substrates and connecting the second and third conducting films. The pixel electrodes and the second conducting film are formed from a common starting film. The second conducting film is connected with the first conducting film through the openings extending through the insulator. The second conducting film, the conducting spacers, and the third conducting film are connected in turn on the insulator formed in the openings. The conducting spacers maintain the cell gap between the first and second substrates.

A still other embodiment of the invention resides in a contact structure for connecting a conducting film formed on a first substrate with a conducting film formed on a second substrate opposite to the first substrate, the contact structure comprising: a cell gap defined between the first and second substrates; a first conducting film formed on the first substrate; a dielectric film covering the first conducting film; openings formed in the dielectric film and exposing parts of the first conducting film; a second conducting film covering the openings; a third conducting film formed over the second substrate; a fourth conducting film formed between the second substrate and the third conducting film and in contact with the third conducting film; and conducting spacers held between the first and second substrates. The first conducting film, the second conducting film, the conducting spacers, the third conducting film, and the fourth conducting films are connected in turn through the openings. The spacers maintain the cell gap between the first and second substrates.

Other objects and features of the invention will appear in the course of the description thereof, which follows.

DETAILED DESCRIPTION OF THE INVENTION

Embodiment 1

Figure 1:
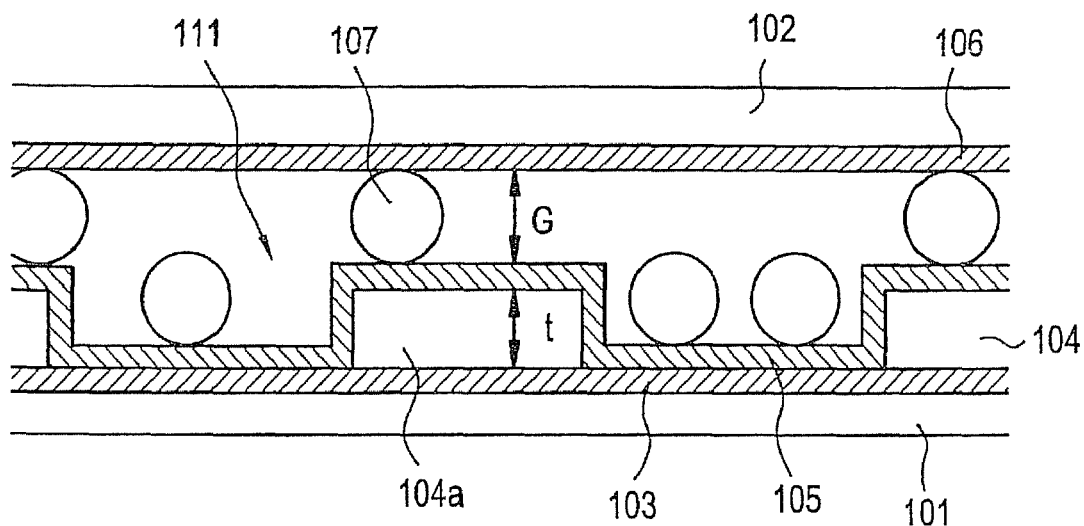
FIG. 1 is a fragmentary cross-sectional view of a common contact portion in accordance with the present invention.
Figure 2A:
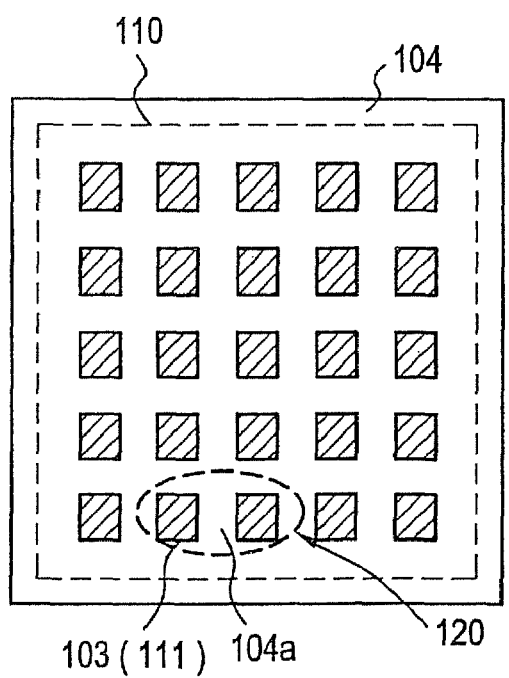
FIGS. 2A and 2B are top plan views of the common contact portion shown in FIG. 1.
Figure 2B:
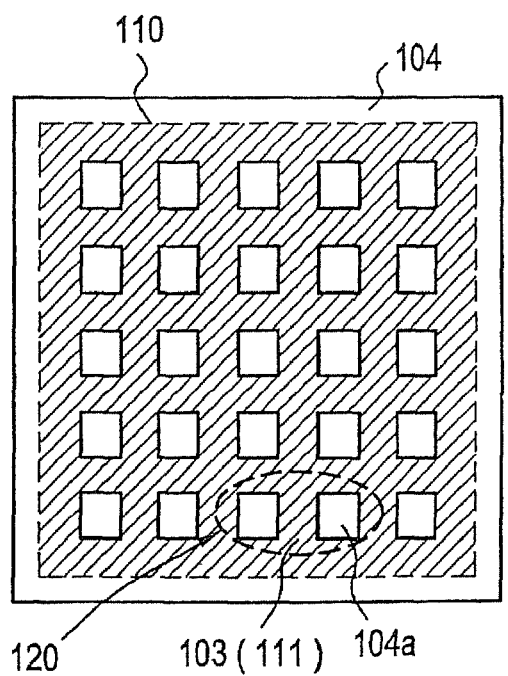

The present embodiment of this invention is described by referring to FIGS. 1, 2A and 2B. FIG. 1 is a fragmentary cross-sectional view of a common contact portion of a liquid crystal display in accordance with the present embodiment. FIGS. 2A and 2B are top plan views of the TFT substrate of the liquid crystal display. The structure of a region 120 shown in FIG. 2A is depicted in the enlarged cross section of FIG. 1.

Figure 13:
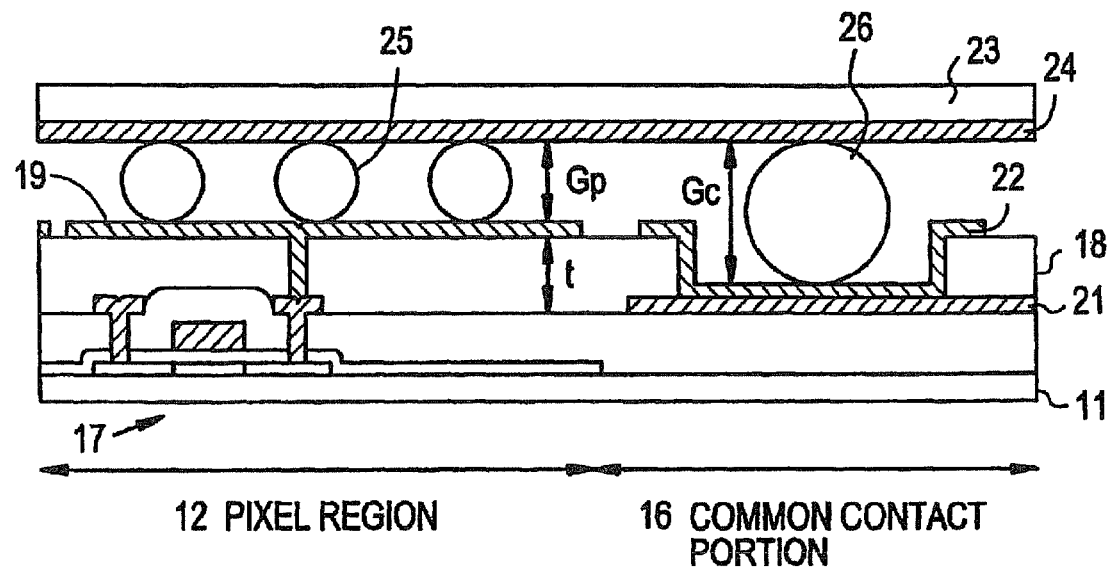
FIG. 13 is a cross-sectional view of a pixel region and a common contact portion on the TFT substrate shown in FIG. 12.
Figure 14:
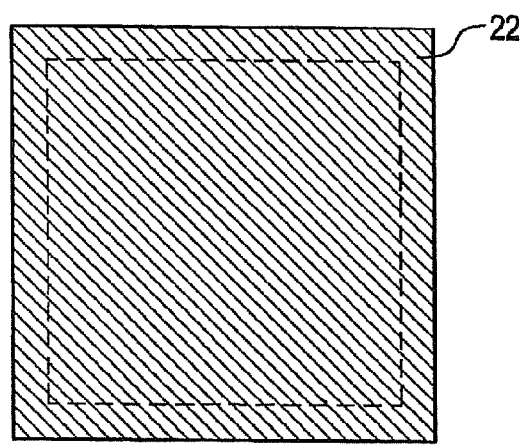
FIG. 14 is a top plan view of the common contact portion shown in FIG. 13.

As shown in FIG. 13, in the prior art structure, the spacers in the pixel region 12 are located over the interlayer insulating film 18 via the pixel electrode 19. However, the interlayer dielectric film 18 does not exist under the conducting pad 22 at the common contact portion 16. Hence, the cell gap $G_c$ in the common contact portion depends on the thickness of the interlayer dielectric film 18.

Accordingly, in the present embodiment, an insulator, or a dielectric, is inserted under the conducting pad in the common contact portion. Conducting spacers are placed on top of the dielectric, so that the cell gap $G_c$ in the contact portion does not depend on the thickness of the interlayer dielectric film 18. In the present embodiment, openings are formed, selectively leaving the interlayer dielectric film 18.

In the present embodiment, as shown in FIG. 1, a first conducting film 103 is formed on a first substrate 101. A dielectric film 104 is deposited on the first conducting film 103. The dielectric film 104 is selectively left to form openings 111 that expose parts of the first conducting film 103. A second conducting film 105 is formed so as to cover the left parts of the dielectric film, 104a, and the openings 111.

A third conducting film 106 is formed on the second substrate 102. Conducting spacers 107 are sandwiched between the first substrate 101 and the second substrate 102.

In the prior art opening 110 shown in FIG. 2A, the dielectric film 104 has been fully removed. In the present embodiment, the dielectric film 104 is selectively left to form the dielectric film portions 104a and the openings 111. The openings 111 expose parts of the first conducting film 103. The first conducting film 103 is connected with the second conducting film 105 at these openings 111.

On the first substrate 101, the left dielectric film 104a is closest to the second substrate 102; therefore, on the left dielectric film 104a, the second conducting film 105 formed on the first substrate electrically connects with the third conducting film 106 formed on the second substrate 102 through the conducting spacer 107, as shown in FIG. 1.

In region 110, the left dielectric film 104a is closest to the second substrate; therefore, the conducting spacers 107 electrically connecting the second conducting film 105 with the third conducting film 106 maintain the gap G between the substrates. Consequently, this gap G is dependent only on the size of the conducting spacers 107. Therefore, where the conducting spacers 107 are uniform among liquid-crystal cells, the gap G can be made uniform among cells, even if the thickness t of the dielectric film 104 differs among cells.

In the present embodiment, it is desired that the area of each opening 111 be sufficiently larger than the area occupied by each conducting spacer and offer space so that the conducting spacers can move freely, because the spacers 107 existing in the openings 111 do not contribute toward maintaining the gap. Otherwise, plural conducting spacers 107 would be stacked on top of each other, making it impossible to maintain the cell gap G uniform across the cell.

Also in the present embodiment, it is desirable that the area of the surface of each left dielectric film portion 104a be sufficiently larger than the area occupied by each conducting spacer 107, assuring arrangement of the conducting spacers 107. If the spacers 107 are not positioned over the dielectric film 104a with certainty, it will not be possible to make electrical connections between the first and second substrates. Furthermore, the gap will not be maintained.

The openings 111 are formed as shown in FIG. 2A in the present embodiment. The relation between the left dielectric film 104a and each opening 111 may be reversed as shown in FIG. 2B. It is noted that FIG. 1 is an enlarged view of the region 120 indicated by the broken line in FIG. 2B.

Embodiment 2

The present embodiment is described by referring to FIGS. 1 and 2A. FIG. 1 is a cross-sectional view of a common contact portion of the liquid crystal display in accordance with the present embodiment. FIG. 2A is a top plan view of the TFT substrate of the liquid crystal display. FIG. 1 is an enlarged cross-sectional view of the region 120 indicated by the broken line in FIG. 2A.

A dielectric is inserted under a conducting pad in the common contact portion, in the same manner as in Embodiment 1. Conducting spacers are positioned on the dielectric. Thus, the cell gap $G_c$ in the common contact portion does not depend on the thickness of the interlayer dielectric film 18. The present embodiment is characterized in that the dielectric film 18 is selectively left to form openings.

In particular, in the present embodiment, the dielectric layer is formed underneath the conducting pad 22. The conducting spacers are positioned on the dielectric. Consequently, the cell gap $G_c$ in the common contact portion is not dependent on the thickness of the interlayer dielectric film 18.

Referring to FIG. 1, a first conducting film 103 is formed on top of a first substrate 101. A dielectric film 104 covers the first conducting film 103. The dielectric film 104 is provided with openings 111 to selectively expose the surface of the first conducting film 103. The exposed portions of the dielectric 104 are indicated by 104a. A second conducting film 105 is formed to cover the openings 111.

A third conducting film 106 is formed on the second substrate 102. Conducting spacers 107 are located between the first substrate 101 and the second substrate 102.

FIG. 2A is a top plan view of the TFT substrate, and in which the second conducting film 105 is not yet deposited. In FIG. 2A, the region 110 indicated by the broken line corresponds to the opening for the common contact formed in the interlayer dielectric film 18 of the prior art structure. A dielectric 104a is selectively deposited to leave portions of the first conducting film 103 to be exposed.

The first conducting film 103 is exposed at locations where the dielectric 104a is not deposited. The exposed portions of the first conducting film 103 are connected with the overlying second conducting film 105.

On the first substrate 101, the dielectric 104a is closest to the second substrate. As shown in FIG. 1, on the dielectric 104a, conducting spacers 107 electrically connect the second conducting film 105 on the first substrate 101 with the third conducting film 106 on the second substrate 102.

The dielectric 104a is closest to the second substrate 102. Therefore, the conducting spacers 107 electrically connecting the second conducting film 105 with the third conducting film 106 hold the cell gap G. In consequence, the gap G is dependent only on the size of the conducting spacers 107. Where the spacers 107 are uniform in size, the cell gap G can be rendered uniform among liquid-crystal cells even if the thickness t of the dielectric film 104 differs among cells.

In the present embodiment, the area of each portion not covered with the dielectric 104a is preferably sufficiently wider than the area occupied by one conducting spacer 107 and permits the conducting spacers 107 to move freely, because the spacers 107 existing in the regions where the dielectric 104a is not present do not contribute toward maintaining the gap. Otherwise, plural conducting spacers 107 would be stacked on top of each other, making it impossible to maintain the cell gap G uniform across the cell.

Also in the present embodiment, it is desirable that the area of each portion of the dielectric film 104a be sufficiently larger than the area occupied by one conducting spacer 107 and that the conducting spacers 107 be arranged with certainty. If the spacers 107 are not positioned on the dielectric film 104a with certainty, it will not be possible to make electrical connections between the first and second substrates. Furthermore, the cell spacing will not be maintained.

In this embodiment, the dielectric 104a is deposited as shown in FIG. 2A. The relation between the regions where the dielectric 104a is deposited and each region where the first conducting film 103 is exposed may be reversed as shown in FIG. 2B.

Example 1

Figure 3:
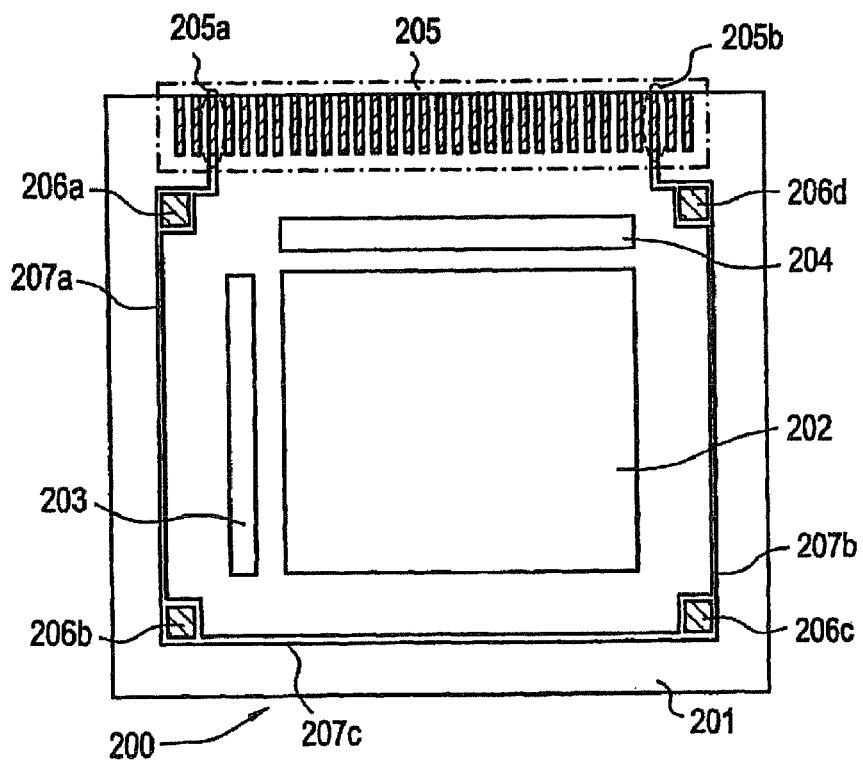
FIG. 3 is a top plan view of the TFT substrate of a liquid crystal display in accordance with Example 1 of the invention.
Figure 4:
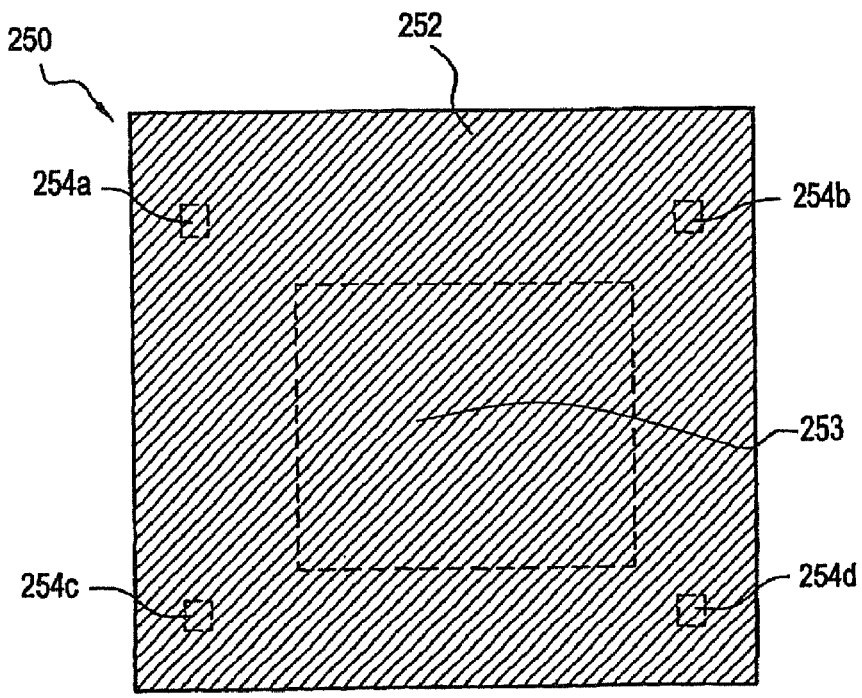
FIG. 4 is a top plan view of the counter substrate of the liquid crystal display in accordance with Example 1.

In this example, the present invention is applied to a common contact portion of a reflection-type liquid crystal display. FIG. 3 is a top plan view of the TFT substrate of this liquid crystal display. FIG. 4 is a top plan view of the counter substrate of the liquid crystal display.

Referring to FIG. 3, the TFT substrate 200 comprises a substrate 201 having a pixel region 202, a scanning line driver circuit 203, and a signal line driver circuit 204. Pixel electrodes and TFTs connected with the pixel electrodes are arranged in rows and columns in the pixel region 202. The scanning line driver circuit 203 controls the timing at which each TFT is turned on and off. The signal line driver circuit 204 supplies image data to the pixel electrodes. Extractor terminals 205 are also provided to supply electric power and control signals from the outside. Common contact portions 206a-206d form junctions with the counter electrode.

As shown in FIG. 4, the counter substrate 250 comprises a substrate on which a counter electrode 252 consisting of a transparent conducting film is deposited. A central rectangular region 253 is opposite to the pixel region 202 of the TFT substrate 200. Four corner regions 254a-254d are electrically connected with the contact portions 206a-206d, respectively, of the TFT substrate 200.

As shown in FIG. 3, conducting pads are formed in the common contact portions 206a-206d, respectively, of the TFT substrate 200. These conducting pads are electrically connected together by internal conducting lines 207a-207c. The internal lines 207a and 207b extend to the extractor terminals 205 and are electrically connected with common terminals 205a and 205b, respectively.

A process sequence for manufacturing the pixel region 202 and the common contact portions 206a-206d on the TFT substrate is next described by referring to FIGS. 5A-5G.

First, the substrate 201 having an insulating surface was prepared. In the present example, a silicon oxide film was formed as a buffer film on the glass substrate. An active layer 302 consisting of a crystalline silicon film was formed over the substrate 201. Although only one TFT is shown, millions of TFTs are built in the pixel region 202 in practice.

In the present example, an amorphous silicon film was thermally crystallized to obtain the crystalline silicon film. This crystalline silicon film was patterned by an ordinary photolithographic step to obtain the active layer 302. In this example, a catalytic element such as nickel for promoting the crystallization was added during the crystallization. This technology is described in detail in Japanese Unexamined Patent Publication No. 7-130652.

Figure 5A:
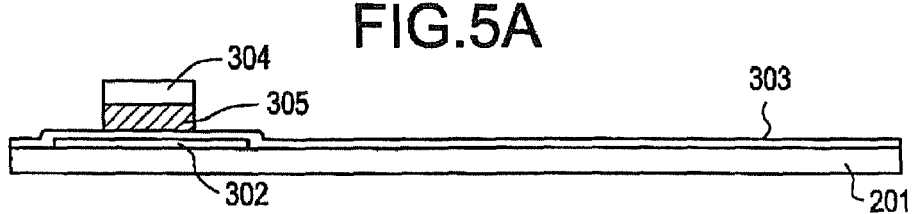
FIGS. 5A-5G are cross-sectional views illustrating a process sequence for fabricating the TFT substrate shown in FIG. 3.

Then, a silicon oxide film 303 having a thickness of 150 nm was formed. An aluminum film (not shown) containing 0.2% by weight of scandium was deposited on the silicon oxide film 303. The aluminum film was patterned, using a resist mask 304, into an island pattern 305 from which gate electrodes will be formed (FIG. 5A).

The present example made use of the anodization technique described in Japanese Unexamined Patent Publication No. 7-135318. For further information, refer to this publication.

Figure 5B:

First, the island pattern 305 was anodized within a 3% aqueous solution of oxalic acid while leaving the resist mask 304 on the island pattern 305, the mask 304 having been used for the patterning step. At this time, an electrical current of 2 to 3 mV was passed, using a platinum electrode as a cathode. The voltage was increased up to 8 V. Since the resist mask 304 was left on the top surface, porous anodic oxide film 306 was formed on the side surfaces of the island pattern 305 (FIG. 5B).

After removing the resist mask 304, anodization was carried out within a solution prepared by neutralizing a 3% aqueous solution of tartaric acid with aqueous ammonia. At this time, the electrical current was set to 5-6 mV. The voltage was increased up to 100 V. In this way, a dense anodic oxide film 307 was formed.

The above-described anodic oxidation step defined the unoxidized island pattern 305 into gate electrodes 308. Internal connecting lines 207c interconnecting the common contact portions 206b and 206c were created from the aluminum film described above simultaneously with the gate electrodes 308.

Figure 5C:
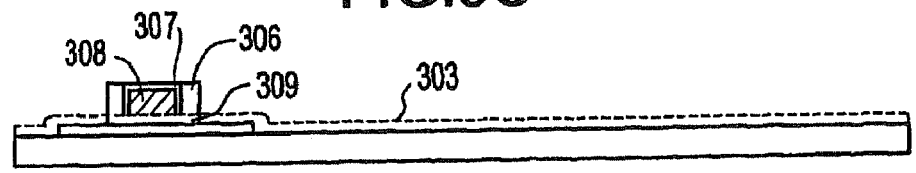

Then, using the gate electrodes 308 and surrounding anodic oxide film 306, 307 as a mask, the silicon oxide film 303 was etched into a gate insulating film 309. This etching step relied on dry etching using $CF_4$ gas (FIG. 5C).

After the formation of the gate insulating film 309, the porous anodic oxide film 306 was removed by wet etching using Al mixed acid.

Thereafter, impurity ions for imparting one conductivity type were implanted by ion implantation or plasma doping. Where N-type TFTs are placed in the pixel region, P (phosphorus) ions may be implanted. Where P-type TFTs are placed, B (boron) ions may be implanted.

In the present example, the above-described process for implanting the impurity ions was carried out twice by ion implantation. The first step was performed under a high accelerating voltage of 80 keV. The system was so adjusted that the peak of the impurity ions was brought under the ends (protruding portions) of the gate insulating film 309. The second step was effected under a low accelerating voltage of 5 keV. The accelerating voltage was adjusted so that the impurity ions were not implanted under the ends (protruding portions) of the gate insulating film 309.

Figure 5D:
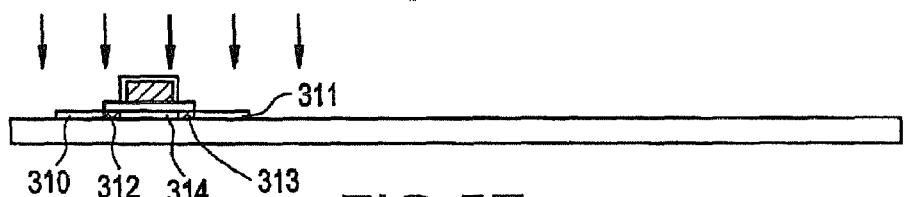

In this way, a source region 310, a drain region 311, lightly doped regions 312, 313, and a channel region 314 for the TFT were formed. The lightly doped region 313 on the side of the drain region 311 is also referred to as the LDD region (FIG. 5D).

At this time, it is preferable to implant the impurity ions to such a dosage that the source and drain regions 310 and 311, respectively, exhibit a sheet resistance of 300 to 500Ω/□. In addition, it is necessary to optimize the lightly doped regions 312 and 313 according to the performance of the TFT. After the impurity ion implantation step, a thermal treatment was carried out to activate the impurity ions.

Then, a 1 μm-thick-silicon oxide film was formed as a first interlayer dielectric film 315. The thickness of the interlayer dielectric film 315 was set to 1 μm to flatten the surface of the first interlayer dielectric film 315 as much as possible. This could mitigate the protrusions due to the gate electrodes 308.

The first interlayer dielectric film 315 may be made of silicon nitride or silicon oxynitride, as well as silicon oxide. Alternatively, the first interlayer dielectric film 315 may be a multilayer film of these materials.

Contact holes for gaining access to the source and drain regions 310 and 311, respectively, were created in the first interlayer dielectric film 315. Contact holes for allowing access to the internal conducting lines 207c were formed in the common contact portions 206b and 206c. Then, a conducting film forming a precursor for source and drain electrodes 316 and 317, respectively, and for internal conducting lines 318 was deposited.

In this example, the conducting film was created from a multilayer film of titanium (Ti), aluminum (Al), and titanium (Ti) by sputtering. Each of the titanium layers was 100 nm thick, while the aluminum layer was 300 nm thick. This multilayer film was patterned to form a source electrode 316, a drain electrode 317, and internal conducting lines 318 (FIG. 5E).

Figure 5E:
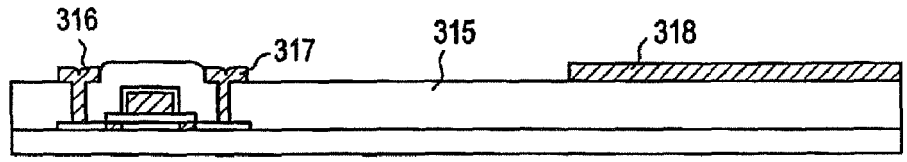
Figure 5F:
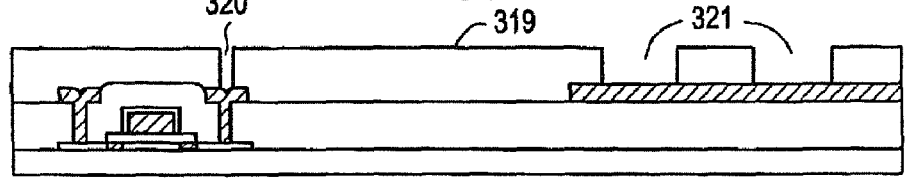

The internal conducting lines 318 shown FIG. 5E correspond to the internal conducting lines 207a and 207b shown in FIG. 3. These conducting lines 207a and 207b were connected with internal conducting lines 207c at the common contact portions 206b and 206c. The internal conducting lines 207c and the gate electrode 307 were created by the same processing steps.

Subsequently, an organic resinous film was formed as a second interlayer dielectric film 319 to a thickness of 1 to 2 μm. Polyimide, polyamide, polyimidamide, acrylic resin, or other material may be used as the material of the organic resinous film. The organic resinous material acts to planarize the surface of the second interlayer dielectric film 319. This is important to make the cell gap uniform. In the present example, polyimide was deposited as the second interlayer dielectric film 319 to a thickness of 1 μm.

Then, contact holes 320 and 321 were formed in the second interlayer dielectric film 319 to have access to the drain electrode 317 and to the internal conducting lines 318, respectively. The contact holes 321 for the internal conducting lines 318 were formed in the openings 111 shown in FIG. 2A. That is, rectangular holes measuring 100 μm×100 μm were arranged in 5 rows and 5 columns within the rectangular region 110 measuring 1.1 mm×1.1 mm. These holes were spaced 100 μm from each other. Moreover, contact holes for connecting the internal conducting lines 318 (207a and 207b) with the common terminals 205a and 205b at the extractor terminals 205 were formed.

As described later, the size of each hole was set to 100 μm×100 μm to set the diameter of the conducting spacers to 3.5 μm in this example. This provides sufficient space so that the conductive spacer located at this position can move. Hence, the conducting spacers are prevented from being stacked on top of each other.

The area of the left portions of the interlayer dielectric film 319 in the common contact portions is large enough to permit the conducting spacers to move. This assures that the conducting spacers are arranged in these regions. Consequently, the conducting spacers positioned in these regions can maintain the cell gap and make electrical connections reliably.

Figure 5G:
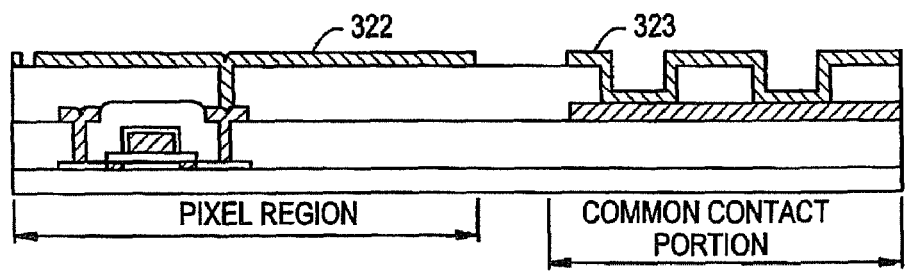

A thin metal film which would later be made into pixel electrodes 322 and a conducting pad 323 were formed to a thickness of 100 to 400 nm. In the present example, the thin metal film was made of an aluminum film containing 1 wt % titanium and deposited to a thickness of 300 nm by sputtering. Then, the thin metal film was patterned to form the pixel electrodes 322 and the conducting pad 323. This pad 323 measured 1.1 mm×1.1 mm, was rectangular, and covered the contact holes 321. The extractor terminals 205 were also patterned. Thus, the TFT substrate was completed (FIG. 5G).

Figure 6:
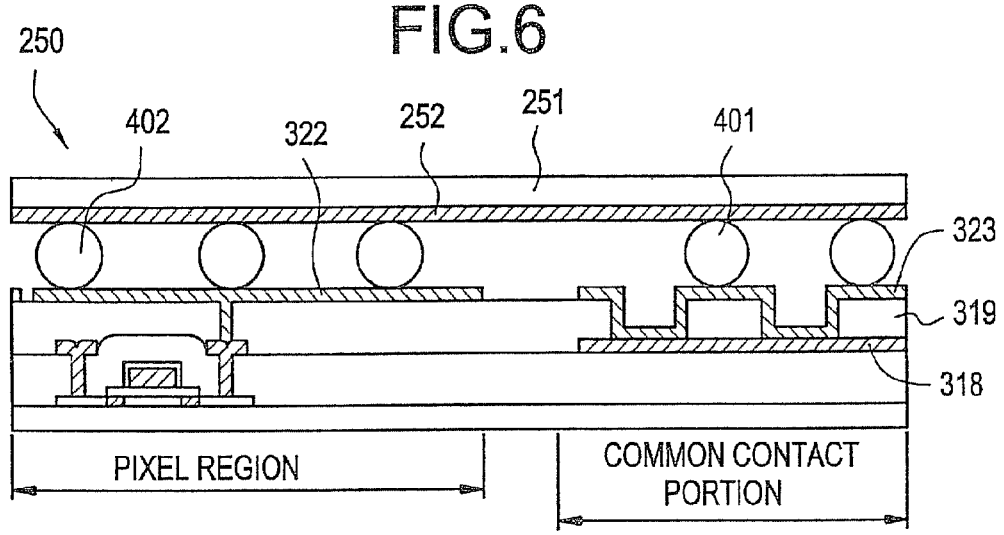
FIG. 6 is a fragmentary cross-sectional view of a pixel region and a common contact portion of the liquid crystal display in accordance with Example 1.

Referring to FIG. 6, the counter substrate 250 comprised a transparent plate 251 on which the counter electrode 252 was formed from an ITO film. A glass or quartz substrate can be used as the substrate 251.

Then, the TFT substrate 200 and the counter substrate 250 were bonded together. This bonding step may be a well-known cell assembly method.

First, a sealing material was applied to one of the TFT substrate 200 and the counter substrate 250. In this example, the sealing material was applied to the counter substrate 250. A UV-curable and thermosetting resin was used as the sealing material. This sealing material was applied around the substrate along straight lines except for the liquid crystal injection port by a sealant dispenser. A sealing material to which 3.0 wt % spherical conducting spacers 401 were added was applied to regions 254a-254d shown in FIG. 4. The sealing material to which the conducting spacers were added functioned as an anisotropic conducting film.

Generally, the conducting spacers 401 consist of resinous spheres coated with a conducting film. In the present example, the conducting spacers 401 were coated with gold (Au). The diameter of the conducting spacers 401 may be larger than the cell gap by about 0.2 to 1 μm. In this example, the conducting spacers 401 had a diameter of 3.5 μm to set the cell gap to 3 μm. After applying the sealing material, it was temporarily baked.

Thereafter, spacers 402 were dispersed onto one of the TFT substrate 200 and the counter substrate 250 to maintain the cell gap. In this example, the spacers 402 were applied to the counter substrate 250. To set the cell gap to 3 μm, spherical spacers of a polymeric material were used as the spacers 402.

Then, the TFT substrate 200 and the counter substrate 250 were held opposite to each other, and they were pressed against each other until the cell gap in the pixel region was decreased to the diameter of the spacers 402. Under the pressed state, UV light was directed at this assembly for more than 10 seconds to cure the sealing material. The cell gap was fixed. Then, the assembly was heated under pressure, thus enhancing the adhesive strength.

Subsequently, a liquid crystal material was injected, and the entrance hole was sealed off, thus completing the cell assembly process. As shown in FIG. 6, the counter electrode 252 on the counter substrate 250 was electrically connected with the conducting pad 323 on the TFT substrate 200 by the conducting spacer 401. On the TFT substrate, the conducting pad 323 connected the internal conducting lines 318 with the common terminals. This connection structure permitted the counter electrode 252 on the counter substrate 250 to be connected with an external power supply via the conducting lines on the TFT substrate. FIG. 1 is an enlarged view of the common contact portion of FIG. 6.

In the present example, to set the cell gap to 3 μm, the spacers 402 applied to the pixel region had a diameter of 3 μm. The diameter of the conducting spacers 401 was 3.5 μm. Setting the diameter of the conducting spacers greater than the diameter of the spacers 402 (i.e., the cell gap) made reliable the connection between the counter electrode 252 and the conducting pad 323. When the two plates were being clamped together to bond them together, the conducting spacers 401 were crushed because they were larger in diameter than the cell gap. This increased the areas of the portions in contact with the counter electrode 252 and with the conducting pad 323, respectively. Hence, the electrical connection was rendered more reliable. Furthermore, the cell gap could be maintained at the same dimension as in the pixel region.

In this example, the internal conducting lines 318 were made of the precursor for the source and drain electrodes 316 and 317, respectively. It is only necessary for the internal conducting lines 318 to be under the pixel electrodes 322. For instance, where a black matrix consisting of a conducting film of titanium or the like is formed inside the second interlayer dielectric film 319, the internal conducting lines 318 can be formed from this conducting film.

In the present example, it is important to flatten the surface of the second interlayer dielectric film 319 on which the pixel electrodes 322 are formed in order to make uniform the cell gap. Also, the flatness of the surface of the first interlayer dielectric film 315 where the internal conducting lines 318 are formed is important.

Methods of obtaining an interlayer dielectric film having a flat surface include a method of increasing the thickness of the interlayer dielectric film, a leveling method using an organic resinous film, a mechanical polishing method; and etch-back techniques. The present example made use of the method of increasing the film thickness to planarize the first interlayer dielectric film 315. Also, the method of relying on leveling using an organic resinous film was used to flatten the first interlayer dielectric film 315. Other methods may also be employed for the same purpose.

In a liquid crystal display in accordance with the present example, a dichroic dye may be dispersed in the liquid crystal layer. Orientation films may be deposited on the TFT substrate and on the counter substrate. Color filters may be formed on the counter substrate. The practitioner may appropriately determine the kind of the liquid crystal layer, the presence or absence of the orientation films and the color filters according to the driving method, the kind of the liquid crystal, and other factors.

For instance, where the color filters are mounted on the counter substrate 250, the color filters are not formed at the common contact portions and so steps are formed between the pixel region and the common contact portions on the counter substrate. To compensate for these steps, it is necessary to make the diameter of the conducting spacers larger by an amount almost equal to the thickness of the color filter.

In the present example, the liquid crystal display is of the reflection type. A transmissive liquid crystal display may also be fabricated. In this case, the precursor for the pixel electrode and for the conducting pad may be made of a transparent ITO film or the like.

In the example described above, the transistor is a coplanar TFT that is a typical top-gate TFT. It may also be a bottom-gate TFT. In addition, thin-film diodes, metal-insulator-metal (MIM) devices, metal-oxide varistors, and other devices can be used, as well as the TFTs.

Example 2

Figure 7:
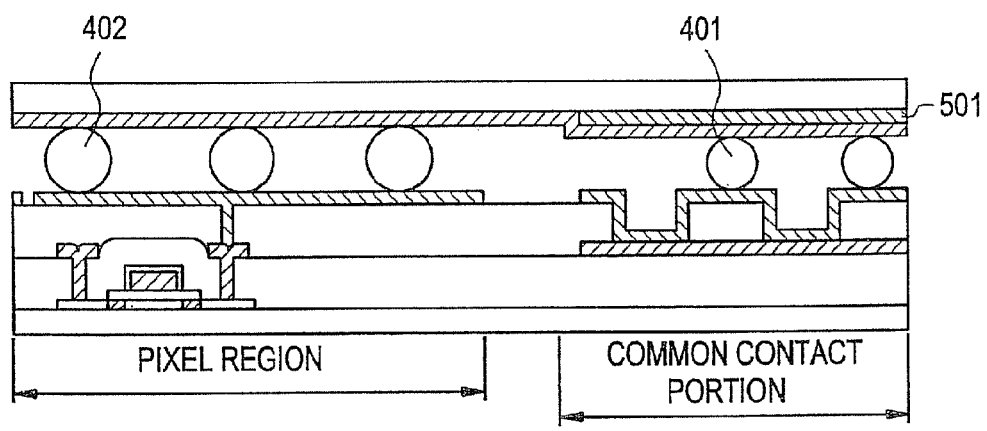
FIG. 7 is a cross-sectional view similar to FIG. 6, but illustrating Example 2 of the invention.
Figure 9:
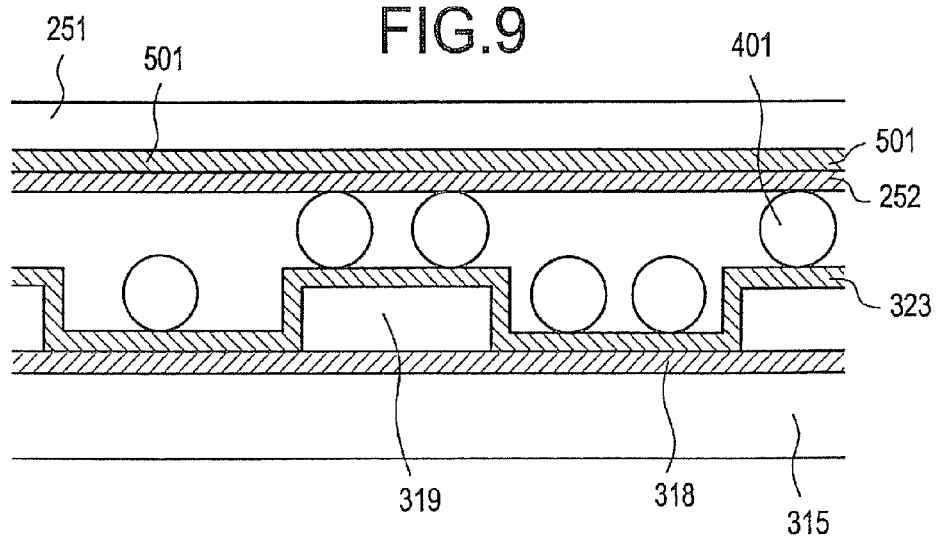
FIG. 9 is an enlarged cross-sectional view of the common contact portion shown in FIG. 7.

The present example is a modification of the common contact portions of Example 1. FIG. 7 is a fragmentary cross-sectional view of an active-matrix display in accordance with the present example. The configuration of a TFT substrate shown in FIG. 7 is the same as the configuration shown in FIG. 6, and some reference numerals are omitted. Like components are indicated by like reference numerals in both FIGS. 6 and 7. FIG. 9 is an enlarged view of the common contact portion shown in FIG. 7.

In Example 1 shown in FIG. 6, the counter electrode 252 consists of an ITO film that is a transparent conducting film. Therefore, the counter electrode 252 and the conducting spacers 401 are larger in electrical resistance than metal films. The present example is intended to reduce this electrical resistance.

Accordingly, the resistance value between the counter electrode 252 and the conducting spacers 401 can be lowered by forming a metallization layer on the counter substrate 250 and patterning the metallization layer into conducting pads, or conducting film, 501 at the common contact regions 254a-254d. Importantly, the conducting film forming the conducting pads 501 is lower in electrical resistance than the conducting film forming the counter electrode 252.

Where the black matrix on the counter substrate is formed from a conducting film as consisting of chromium, the connecting pads 501 can be formed from this conducting film. When the conducting film is patterned to form the black matrix, the connecting pad 501 may be created.

Example 3

Figure 8:
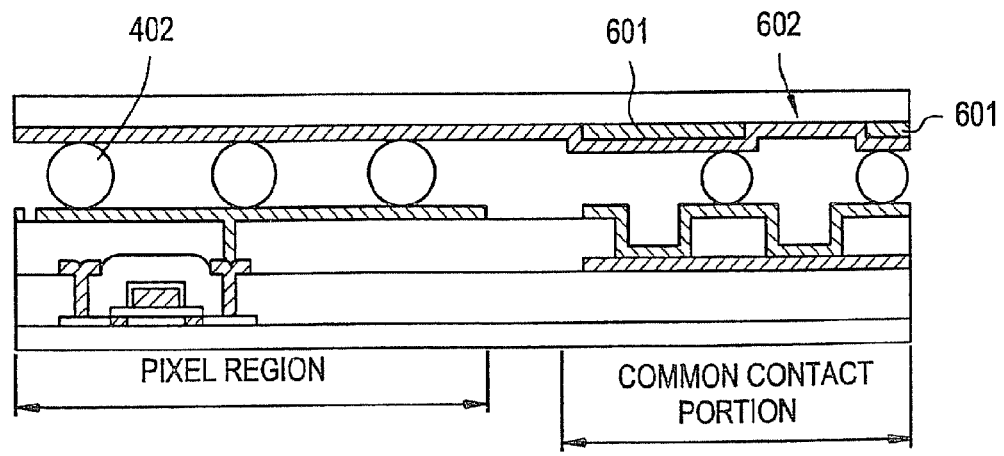
FIG. 8 is a cross-sectional view similar to FIG. 6, but illustrating Example 3 of the invention.
Figure 10:
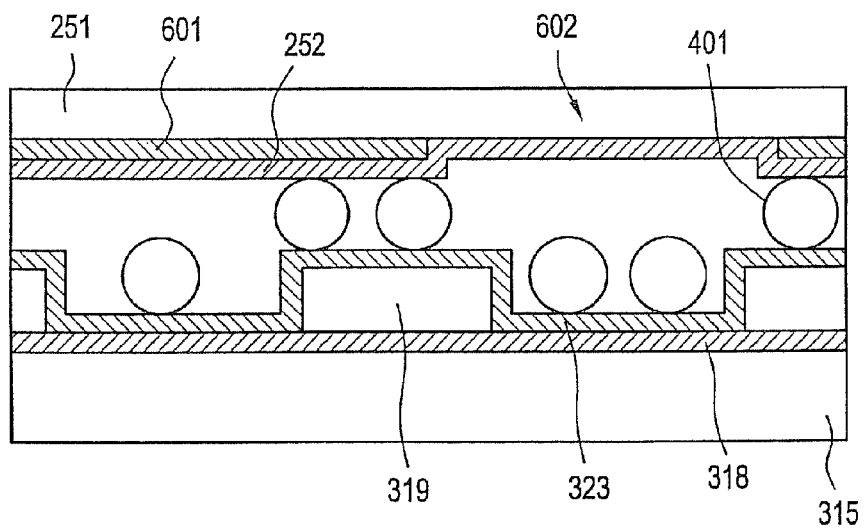
FIG. 10 is an enlarged cross-sectional view of the common contact portion shown in FIG. 8.

The present example is a modification of Example 2. FIG. 8 is a fragmentary cross-sectional view of an active-matrix display in accordance with the present example. The TFT substrate shown in FIG. 8 is identical in structure with that shown in FIG. 6, and some reference numerals are omitted in FIG. 8. It is noted like components are denoted by like reference numerals in both FIGS. 6 and 8. FIG. 10 is an enlarged view of the common contact portion of FIG. 8.

In Example 1, both counter substrate 251 and counter electrode 252 are transparent to light and so the distribution of the conducting spacers 401 on the common contact portions can be visually observed from the side of the counter substrate 250 after both substrates have been bonded together. In Example 2, however, the connecting pad 501 consisting of metallization layer is formed and, therefore, the distribution of the conducting spacers 401 cannot be visually checked.

The present example is intended to permit one to visually observe the distribution of the conducting spacers 401 while a connecting pad is provided to lower the resistance value. For this purpose, the connecting pad, 601, is provided with openings formed at selected locations. One can observe the conducting spacers 401 through these openings.

Figure 11:
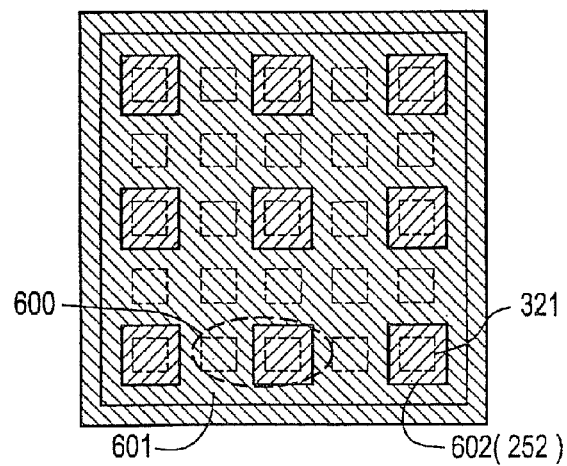
FIG. 11 is a top plan view of the common contact portion shown in FIG. 8.
Figure 12:
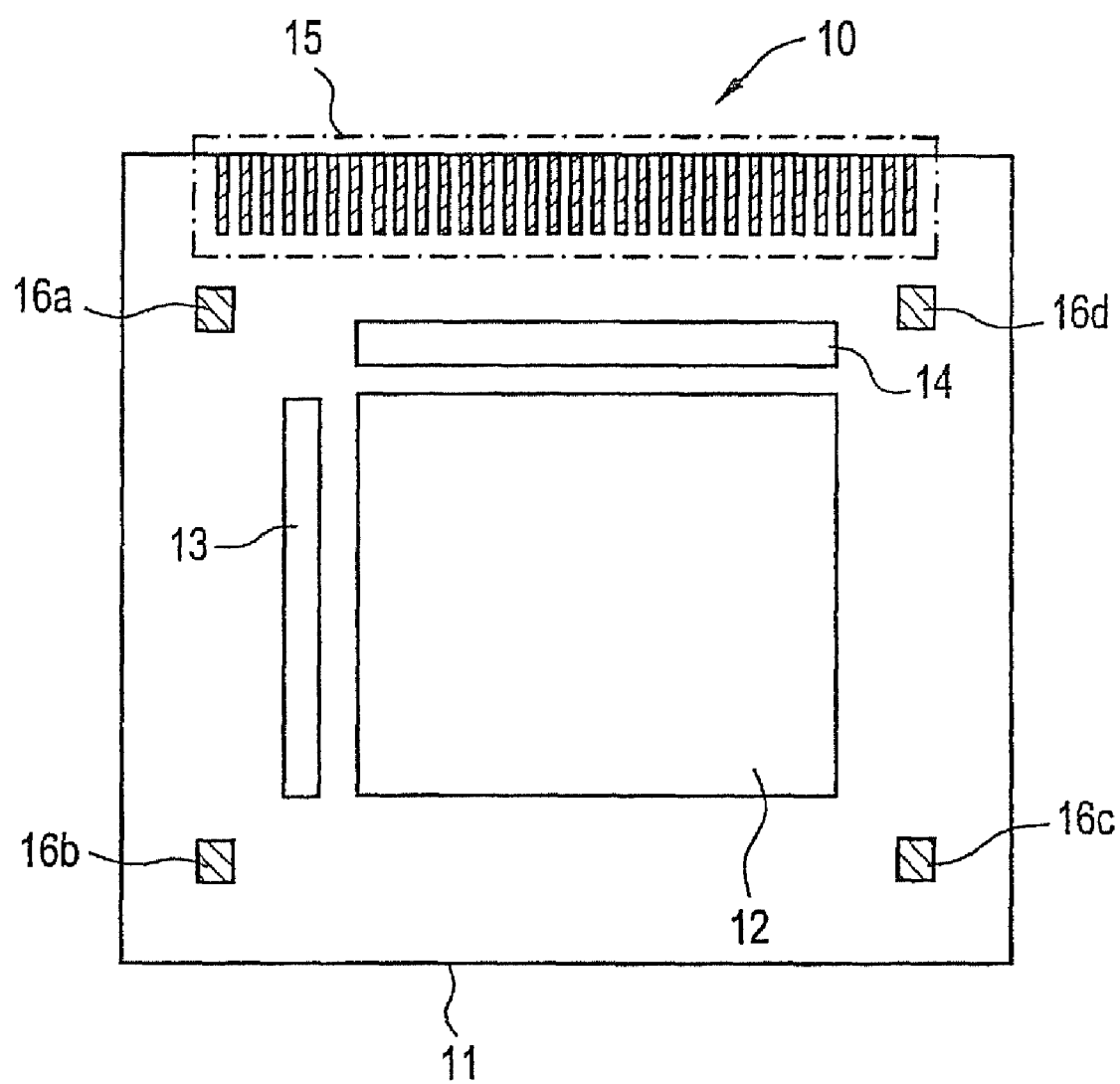
FIG. 12 is a top plan view of the TFT substrate of the prior art liquid crystal display.

FIG. 11 is a top plan view of the contact portions according to the present example, taken from the side of the counter substrate. FIG. 10 is a cross-sectional view of the common contact portion in a region 600 surrounded by the broken line. As shown in FIG. 11, the connecting pad 601 is formed with openings 602. In each opening 602, there exist only the counter substrate 251 and the counter electrode 252, both of which have transparency. Hence, the distribution of the conducting spacers 401 can be observed through the openings 602.

To maintain the cell gap, the openings 602 should be formed opposite to the contact holes 321 formed in the second interlayer dielectric film of the TFT substrate. At these locations, the conducting spacers 401 are not in contact with the counter electrode. The area of each opening 602 should be slightly larger than the area of each contact holes 321 formed in the second interlayer dielectric film, i.e., about several to thirty percent greater. The number of the openings 602, their arrangement, and their shape are not limited to the example of FIG. 11. Rather, one can arbitrarily set these geometrical factors.

Setting each opening 602 in the connecting pad 601 slightly larger than each contact holes 321 makes it possible to visually check the conducting pad 323 on the second interlayer dielectric film 319, which contributes to electrical connection.

In Examples 2 and 3, the cell gap in the common contact portions is made uniform. At the same time, the contact resistances of the conducting spacers 401 and of the counter electrode 252 are decreased. If the main purpose is to lower these resistance values, the common contact portions on the TFT substrate may have the prior art structure as shown in FIG. 13. In this case, any of the connecting pads 501 and 601 described in Examples 2 and 3, respectively, may be formed between the substrate 23 and the counter electrode 24 at the common contact portions 16 shown in FIG. 13.

In Examples 1-3 described above, the present invention is applied to active-matrix liquid crystal displays. The contact structure in accordance with the present invention is applicable to any apparatus having a contact structure for electrically connecting conductors formed on one substrate with conducting conductors formed on the other opposite substrate via conducting spacers. For example, the novel contact structure can connect ICs built on different silicon wafers.

The common contact structure in accordance with the present invention can eliminate variations of the cell gap among liquid-crystal cells even if the film thickness varies among interlayer dielectric films. Also, poor contacts due to conducting spacers can be reduced.

In particular, in accordance with the present invention, the cell gap depends only on the size of conducting spacers. Therefore, where the conducting spacers are uniform in size, the cell gap between opposite substrates or plates can be made uniform among different liquid-crystal cells, if the thickness of a dielectric film electrically insulating the first and second conducting films is different among different liquid-crystal cells.

What is claimed is:

1. An active matrix display comprising:
a first substrate having a pixel region and a common contact portion;
the pixel region comprising:
a thin film transistor;
an insulating film formed over the thin film transistor; and
a pixel electrode formed over the insulating film,
the common contact portion comprising:
a first conductive film;
the insulating film formed over the first conductive film; and
a second conductive film formed over the insulating film and electrically connected to the first conductive film;
a second substrate having a counter electrode opposed to the pixel region and the common contact portion; and
a plurality of conductive spacers between the first substrate and the second substrate,
wherein at least one of the plurality of conductive spacers is over the second conductive film and the insulating film and in contact with both the counter electrode and the second conductive film.

2. The active matrix display according to claim 1, wherein the active matrix display is a liquid crystal display.

3. The active matrix display according to claim 1, wherein the thin film transistor is a bottom-gate type thin film transistor.

4. The active matrix display according to claim 1, wherein the insulating film comprises an organic resin, and
wherein the organic resin is selected from the group consisting of polyimide, polyamide, polyimideamide and acrylic resin.

5. The active matrix display according to claim 1, wherein the second conductive film and the pixel electrode comprise indium tin oxide.

6. The active matrix display according to claim 1, wherein the pixel region further comprises a plurality of spacers for maintaining a gap between the first substrate and the second substrate.

7. The active matrix display according to claim 1, wherein the first substrate further comprises another common contact portion.

8. The active matrix display according to claim 1, wherein each of the plurality of conductive spacers comprises a resin coated with gold.

9. The active matrix display according to claim 1, wherein the first substrate further comprises an extractor terminal and a conducting line, and
wherein the extractor terminal is electrically connected to the counter electrode via the conducting line, the common contact portion, and said at least one of the plurality of conductive spacers.

10. An active matrix display comprising:
a first substrate having a pixel region and a common contact portion;
the pixel region comprising:
a thin film transistor; and
a pixel electrode electrically connected to the thin film transistor;
the common contact portion comprising:
a first conductive film;
an insulating film formed over the first conductive film; and
a second conductive film formed over the insulating film and electrically connected to the first conductive film;
a second substrate having a counter electrode opposed to the pixel region and the common contact portion; and a plurality of conductive spacers between the first substrate and the second substrate,
wherein at least one of the plurality of conductive spacers is over the second conductive film and the insulating film and in contact with both the counter electrode and the second conductive film.

11. The active matrix display according to claim 10, wherein the active matrix display is a liquid crystal display.

12. The active matrix display according to claim 10, wherein the thin film transistor is a bottom-gate type thin film transistor.

13. The active matrix display according to claim 10, wherein the insulating film comprises an organic resin, and
wherein the organic resin is selected from the group consisting of polyimide, polyamide, polyimideamide and acrylic resin.

14. The active matrix display according to claim 10, wherein the second conductive film and the pixel electrode comprise indium tin oxide.

15. The active matrix display according to claim 10, wherein the pixel region further comprises a plurality of spacers for maintaining a gap between the first substrate and the second substrate.

16. The active matrix display according to claim 10, wherein the first substrate further comprises another common contact portion.

17. The active matrix display according to claim 10, wherein each of the plurality of conductive spacers comprises a resin coated with gold.

18. The active matrix display according to claim 10, wherein the first substrate further comprises an extractor terminal and a conducting line, and
wherein the extractor terminal is electrically connected to the counter electrode via the conducting line, the common contact portion, and said at least one of the plurality of conductive spacers.

19. An active matrix display comprising:
a first substrate having a pixel region and a common contact portion;
the pixel region comprising:
a thin film transistor;
an insulating film formed over the thin film transistor; and
a pixel electrode formed over the insulating film,
the common contact portion comprising:
a first conductive film;
the insulating film including an opening formed over the first conductive film; and
a second conductive film formed over the insulating film and electrically connected to the first conductive film through the opening;
a second substrate having a counter electrode opposed to the pixel region and the common contact portion; and
a plurality of conductive spacers between the first substrate and the second substrate, the plurality of conductive spacers including a first conductive spacer and a second conductive spacer,
wherein the first conductive spacer is over the second conductive film and the insulating film and in contact with both the counter electrode and the second conductive film, and
wherein the second conductive spacer is in the opening.

20. The active matrix display according to claim 19, wherein the active matrix display is a liquid crystal display.

21. The active matrix display according to claim 19, wherein the thin film transistor is a bottom-gate type thin film transistor.

22. The active matrix display according to claim 19, wherein the insulating film comprises an organic resin, and
wherein the organic resin is selected from the group consisting of polyimide, polyamide, polyimideamide and acrylic resin.

23. The active matrix display according to claim 19, wherein the second conductive film and the pixel electrode comprise indium tin oxide.

24. The active matrix display according to claim 19, wherein the pixel region further comprises a plurality of spacers for maintaining a gap between the first substrate and the second substrate.

25. The active matrix display according to claim 19, wherein the first substrate further comprises another common contact portion.

26. The active matrix display according to claim 19, wherein each of the plurality of conductive spacers comprises a resin coated with gold.

27. The active matrix display according to claim 19, wherein the first substrate further comprises an extractor terminal and a conducting line, and
wherein the extractor terminal is electrically connected to the counter electrode via the conducting line, the common contact portion, and the first conductive spacer.

28. An active matrix display comprising:
a first substrate having a pixel region and a common contact portion;
the pixel region comprising:
a thin film transistor;
an insulating film formed over the thin film transistor; and
a pixel electrode formed over the insulating film,
the common contact portion comprising:
a first conductive film;
the insulating film including a plurality of openings formed over the first conductive film; and
a second conductive film formed over the insulating film and electrically connected to the first conductive film through the plurality of openings;
a second substrate having a counter electrode opposed to the pixel region and the common contact portion; and
a plurality of conductive spacers between the first substrate and the second substrate, the plurality of conductive spacers including a first conductive spacer and a second conductive spacer,
wherein the first conductive spacer is over the second conductive film and the insulating film and in contact with both the counter electrode and the second conductive film, and
wherein the second conductive spacer is in one of the plurality of openings.

29. The active matrix display according to claim 28, wherein the active matrix display is a liquid crystal display.

30. The active matrix display according to claim 28, wherein the thin film transistor is a bottom-gate type thin film transistor.

31. The active matrix display according to claim 28, wherein the insulating film comprises an organic resin, and
wherein the organic resin is selected from the group consisting of polyimide, polyamide, polyimideamide and acrylic resin.

32. The active matrix display according to claim 28, wherein the second conductive film and the pixel electrode comprise indium tin oxide.

33. The active matrix display according to claim 28, wherein the pixel region further comprises a plurality of spacers for maintaining a gap between the first substrate and the second substrate.

34. The active matrix display according to claim 28, wherein the first substrate further comprises another common contact portion.

35. The active matrix display according to claim 28, wherein each of the plurality of conductive spacers comprises a resin coated with gold.

36. The active matrix display according to claim 28, wherein the first substrate further comprises an extractor terminal and a conducting line, and
wherein the extractor terminal is electrically connected to the counter electrode via the conducting line, the common contact portion, and the first conductive spacer.

37. An active matrix display comprising:
a first substrate having a pixel region and a common contact portion;
the pixel region comprising:
a thin film transistor;
an insulating film formed over the thin film transistor; and
a pixel electrode formed over the insulating film,
the common contact portion comprising:
a first conductive film;
the insulating film including an opening formed over the first conductive film; and
a second conductive film formed over the insulating film and electrically connected to the first conductive film through the opening;
a second substrate having a counter electrode opposed to the pixel region and the common contact portion; and
a plurality of conductive spacers between the first substrate and the second substrate, the plurality of conductive spacers including a plurality of first conductive spacers and a plurality of second conductive spacers,
wherein the plurality of first conductive spacers is over the second conductive film and the insulating film and in contact with both the counter electrode and the second conductive film,
wherein the plurality of second conductive spacers is in the opening, and
wherein an area of the opening is sufficiently large so that the plurality of second conductive spacers are not stacked on top of each other.

38. The active matrix display according to claim 37, wherein the active matrix display is a liquid crystal display.

39. The active matrix display according to claim 37, wherein the thin film transistor is a bottom-gate type thin film transistor.

40. The active matrix display according to claim 37, wherein the insulating film comprises an organic resin, and
wherein the organic resin is selected from the group consisting of polyimide, polyamide, polyimideamide and acrylic resin.

41. The active matrix display according to claim 37, wherein the second conductive film and the pixel electrode comprise indium tin oxide.

42. The active matrix display according to claim 37, wherein the pixel region further comprises a plurality of spacers for maintaining a gap between the first substrate and the second substrate.

43. The active matrix display according to claim 37, wherein the first substrate further comprises another common contact portion.

44. The active matrix display according to claim 37, wherein each of the plurality of conductive spacers comprises a resin coated with gold.

45. The active matrix display according to claim 37, wherein the first substrate further comprises an extractor terminal and a conducting line, and
wherein the extractor terminal is electrically connected to the counter electrode via the conducting line, the common contact portion, and the plurality of first conductive spacers.

46. An active matrix display comprising:
a first substrate having a pixel region and a common contact portion;
the pixel region comprising:
a thin film transistor;
an insulating film formed over the thin film transistor; and
a pixel electrode formed over the insulating film,
the common contact portion comprising:
a first conductive film;
the insulating film including an opening formed over the first conductive film; and
a second conductive film formed over the insulating film and electrically connected to the first conductive film through the opening;
a second substrate having a counter electrode opposed to the pixel region and the common contact portion; and
a plurality of conductive spacers between the first substrate and the second substrate, the plurality of conductive spacers including a first conductive spacer, a second conductive spacer and a third conductive spacer,
wherein the first conductive spacer is over the second conductive film and the insulating film and in contact with both the counter electrode and the second conductive film, and
wherein the second conductive spacer and the third conductive spacer are in the opening and in contact with a bottom of the opening.

47. The active matrix display according to claim 46, wherein the active matrix display is a liquid crystal display.

48. The active matrix display according to claim 46, wherein the thin film transistor is a bottom-gate type thin film transistor.

49. The active matrix display according to claim 46, wherein the insulating film comprises an organic resin, and
wherein the organic resin is selected from the group consisting of polyimide, polyamide, polyimideamide and acrylic resin.

50. The active matrix display according to claim 46, wherein the second conductive film and the pixel electrode comprise indium tin oxide.

51. The active matrix display according to claim 46, wherein the pixel region further comprises a plurality of spacers for maintaining a gap between the first substrate and the second substrate.

52. The active matrix display according to claim 46, wherein the first substrate further comprises another common contact portion.

53. The active matrix display according to claim 46, wherein each of the plurality of conductive spacers comprises a resin coated with gold.

54. The active matrix display according to claim 46, wherein the first substrate further comprises an extractor terminal and a conducting line, and
wherein the extractor terminal is electrically connected to the counter electrode via the conducting line, the common contact portion, and the first conductive spacer.

* * * * *

UNITED STATES PATENT AND TRADEMARK OFFICE
CERTIFICATE OF CORRECTION

PATENT NO. : 7,760,316 B2
APPLICATION NO. : 12/480716
DATED : July 20, 2010
INVENTOR(S) : Yoshiharu Hirakata et al.

It is certified that error appears in the above-identified patent and that said Letters Patent is hereby corrected as shown below:

Col. 9, line 62, please change "gate electrode 307" to --gate electrode 308--.

Signed and Sealed this

Twenty-third Day of November, 2010

David J. Kappos
*Director of the United States Patent and Trademark Office*